United States Patent [19]
Murata

[11] Patent Number: 5,711,409
[45] Date of Patent: Jan. 27, 1998

[54] TWIN-CLUTCH-TYPE TRANSMISSION

[75] Inventor: Kiyohito Murata, Susono, Japan

[73] Assignee: Toyota Jidosha Kabushiki Kaisha, Toyota, Japan

[21] Appl. No.: 490,784

[22] Filed: Jun. 15, 1995

[30] Foreign Application Priority Data

Jun. 20, 1994 [JP] Japan ................... 6-137136

[51] Int. Cl.$^6$ ............... F16D 25/14; B60K 41/22; F16H 3/08
[52] U.S. Cl. ................... 192/87.11; 192/87.16; 74/336 R
[58] Field of Search .............. 192/85 R, 87.1, 192/87.14, 85 A, 85 AA; 74/330, 336; 477/143

[56] References Cited

U.S. PATENT DOCUMENTS

| | | | |
|---|---|---|---|
| 2,658,405 | 11/1953 | Dodge | 74/330 |
| 2,687,198 | 8/1954 | Greenlee | 192/87.11 |
| 4,497,222 | 2/1985 | Nagaoka et al. | 74/336 |
| 4,517,859 | 5/1985 | Nagaoka et al. | 74/336 X |
| 4,632,234 | 12/1986 | Bardoll et al. | 192/87.18 X |
| 5,353,662 | 10/1994 | Vaughters | 74/336 |
| 5,449,329 | 9/1995 | Brandon et al. | 477/143 X |

FOREIGN PATENT DOCUMENTS

| | | |
|---|---|---|
| 0 078 116 | 5/1983 | European Pat. Off. . |
| 0 107 786 | 5/1984 | European Pat. Off. . |
| 0 307 389 | 3/1989 | European Pat. Off. . |
| 0 345 423 | 12/1989 | European Pat. Off. . |
| 2314226 | 10/1973 | Germany ............... 192/87.11 |
| 2 225 634 | 12/1973 | Germany . |
| 40 17 961 | 12/1990 | Germany . |
| 42 39 233 | 5/1994 | Germany . |
| 58-200837 | 11/1983 | Japan . |
| 60-135336 | 7/1985 | Japan . |

| | | | |
|---|---|---|---|
| 1746085 | 7/1992 | U.S.S.R. | 192/87.16 |
| WO 93/18314 | 9/1993 | WIPO . | |

*Primary Examiner*—Khoi Q. Ta
*Attorney, Agent, or Firm*—Oblon, Spivak, McClelland, Maier & Neustadt, P.C.

[57] ABSTRACT

A twin-clutch-type transmission which can suitably change a power transmitting route, corresponding to the gear shifting conditions, without requiring complex a control, includes a first clutch mechanism, a second clutch mechanism, a first gear mechanism connected to the first output member of the first clutch mechanism, a second gear mechanism connected to the second output member of the second clutch mechanism, a control device, and an interlocking member.

The first clutch mechanism includes an input member, a first output member, a first pressure plate and a first thrust means which engages the first output member to the input member through the first pressure plate. The second clutch mechanism includes an input member, a second output member, a second pressure plate and a second thrust means which engages the second output member to the input member through the second pressure plate.

The first gear mechanism has gear sets to provide a first group of gear ratios, a second gear mechanism connected to the second output member of the second clutch mechanism. The second gear mechanism has gear sets to provide a second group of gear ratios. The control device controls thrust forces generated by the thrust means so as to change one of the two clutch mechanisms from an engaged condition to a disengaged condition and to change the other of the two clutch mechanism from a disengaged condition to an engaged condition. The interlocking member mechanically interlocks the first pressure plate of the first clutch mechanism and the second pressure plate of the second clutch mechanism.

10 Claims, 20 Drawing Sheets

Fig. 5

| | | FIRST CLUTCH MECHANISM CL1 | SECOND CLUTCH MECHANISM CL2 | FIRST SLEEVE S1 | SECOND SLEEVE S2 |
|---|---|---|---|---|---|
| I | FIRST GEAR SPEED | ENGAGED | DISENGAGED | ENGAGES $G_1$ AND $H_1$ | FREE POSITION |
| II | SECOND GEAR SPEED | DISENGAGED | ENGAGED | FREE POSITION | ENGAGES $G_2$ AND $H_2$ |
| I | THIRD GEAR SPEED | ENGAGED | DISENGAGED | ENGAGES $G_3$ AND $H_1$ | FREE POSITION |
| II | FOURTH GEAR SPEED | DISENGAGED | ENGAGED | FREE POSITION | ENGAGES $G_4$ AND $H_2$ |
| I | REVERSE GEAR SPEED | ENGAGED | DISENGAGED | FREE POSITION | FREE POSITION |

I : FIRST GROUP GEAR SPEEDS

II : SECOND GROUP GEAR SPEEDS

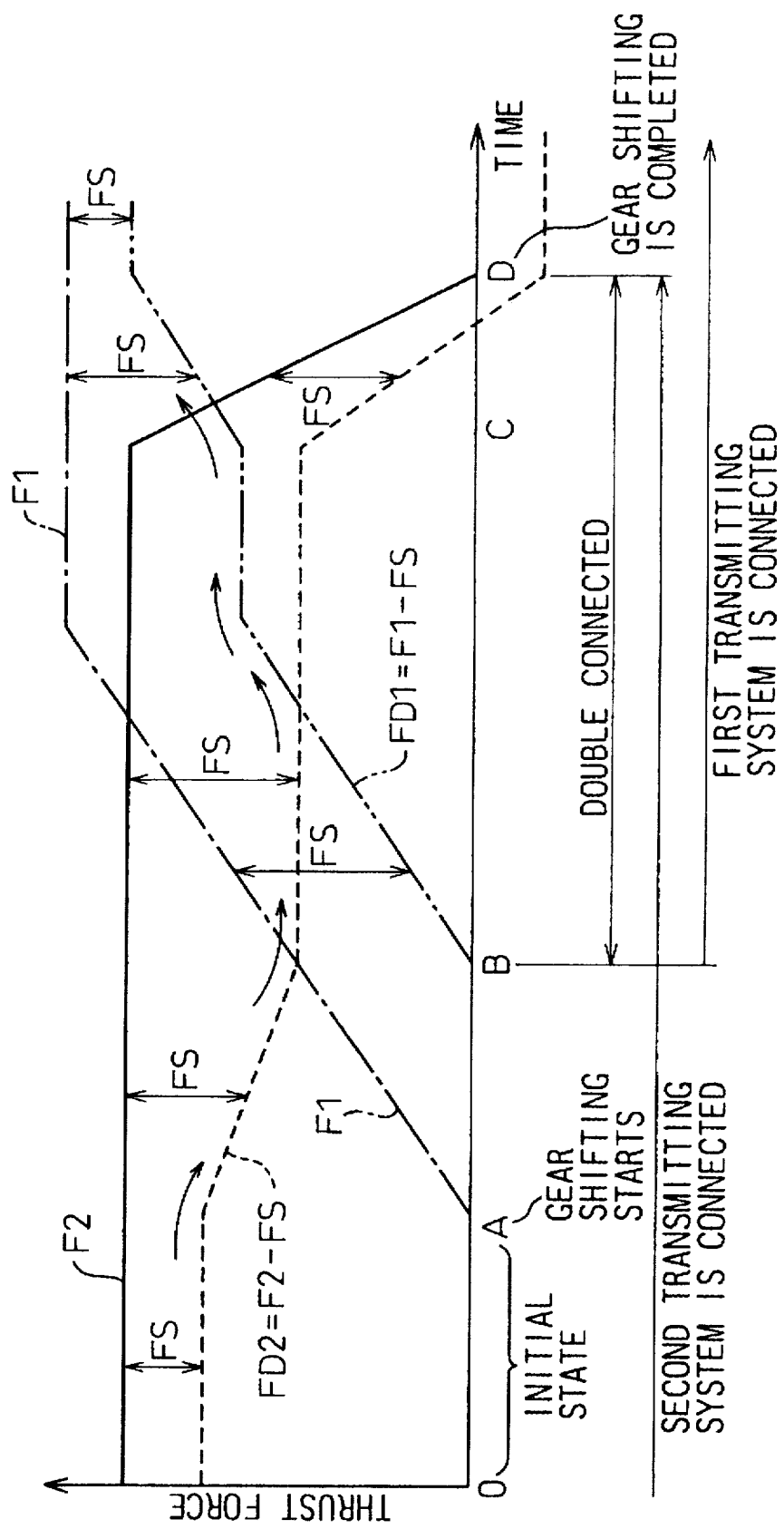

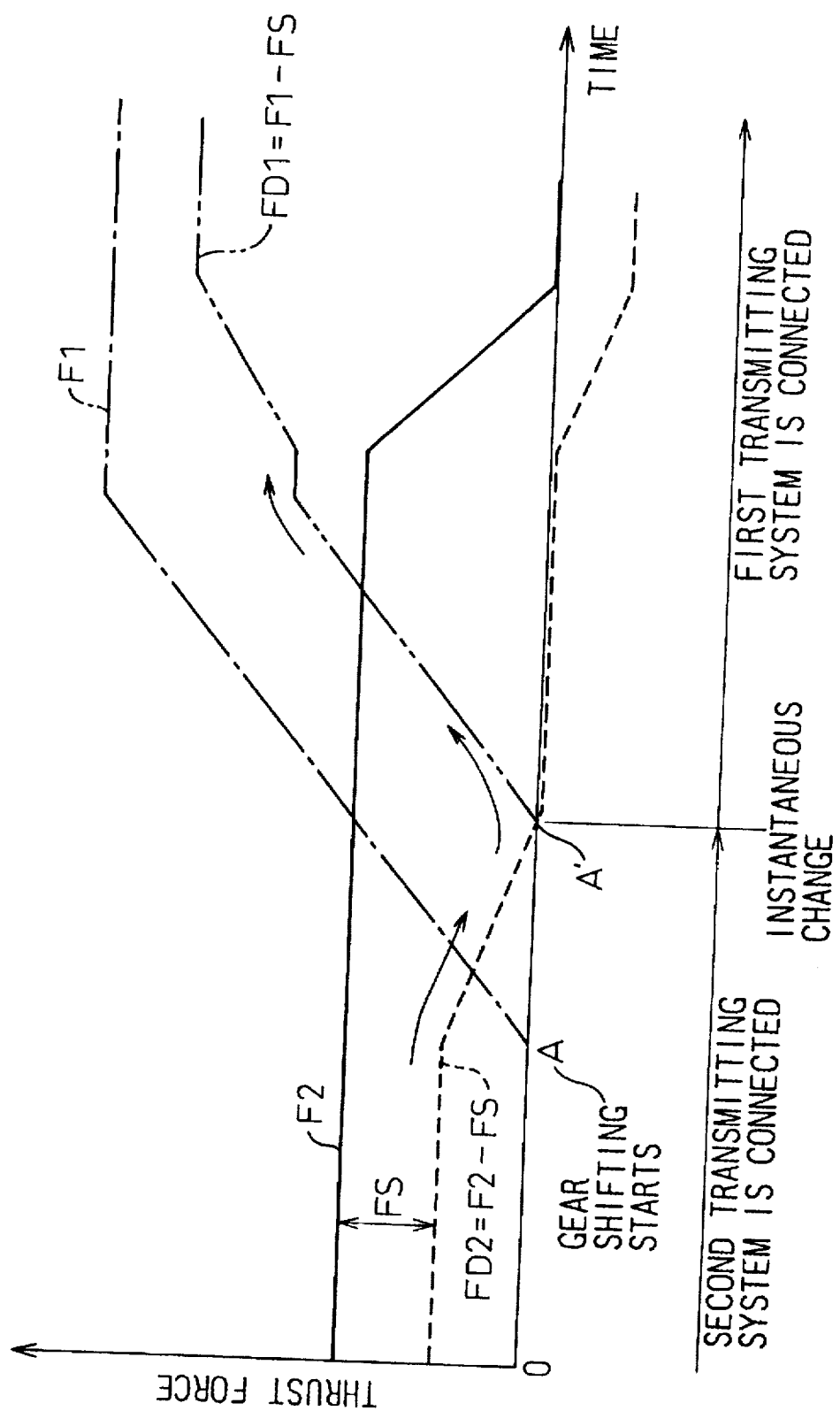

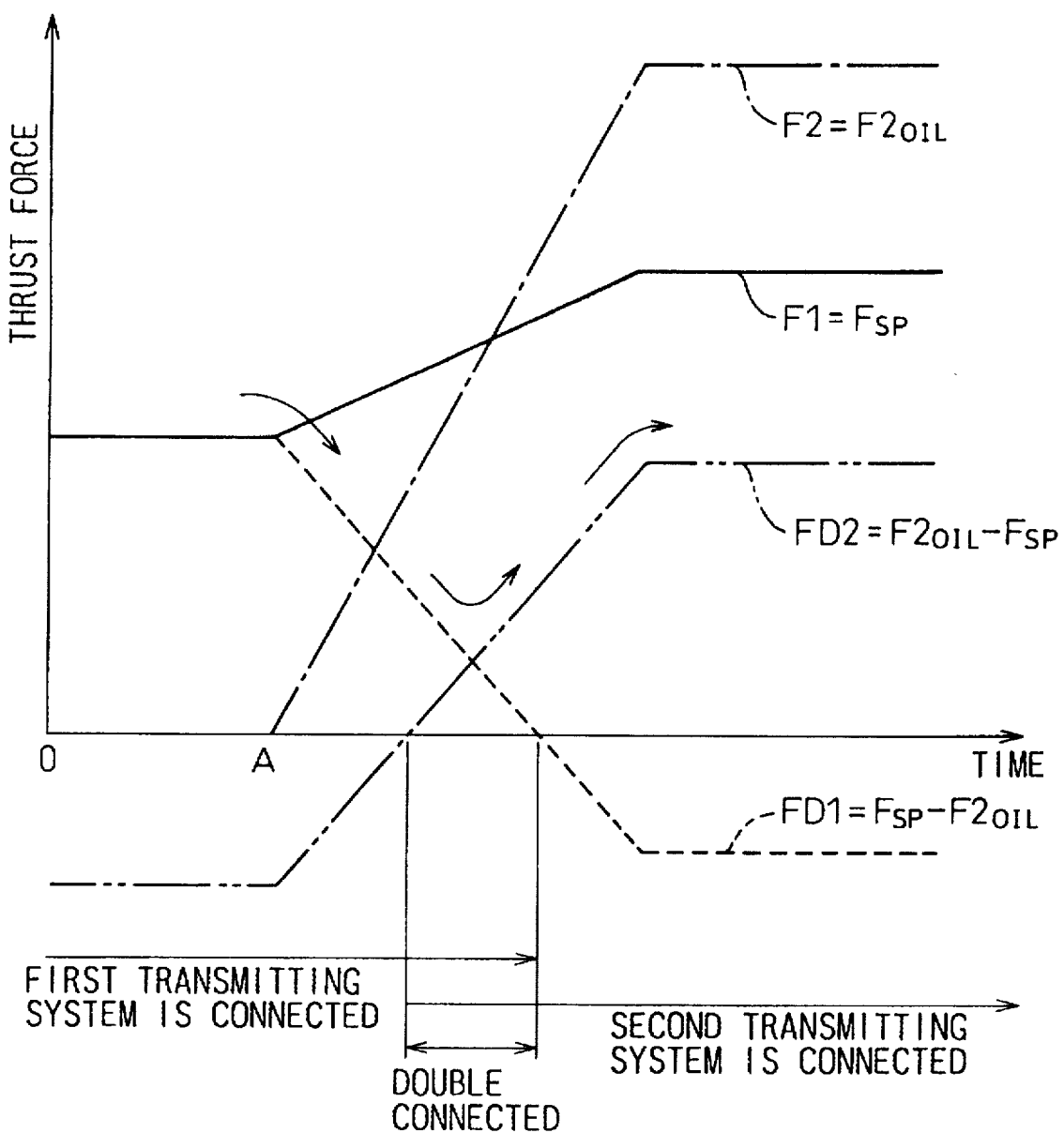

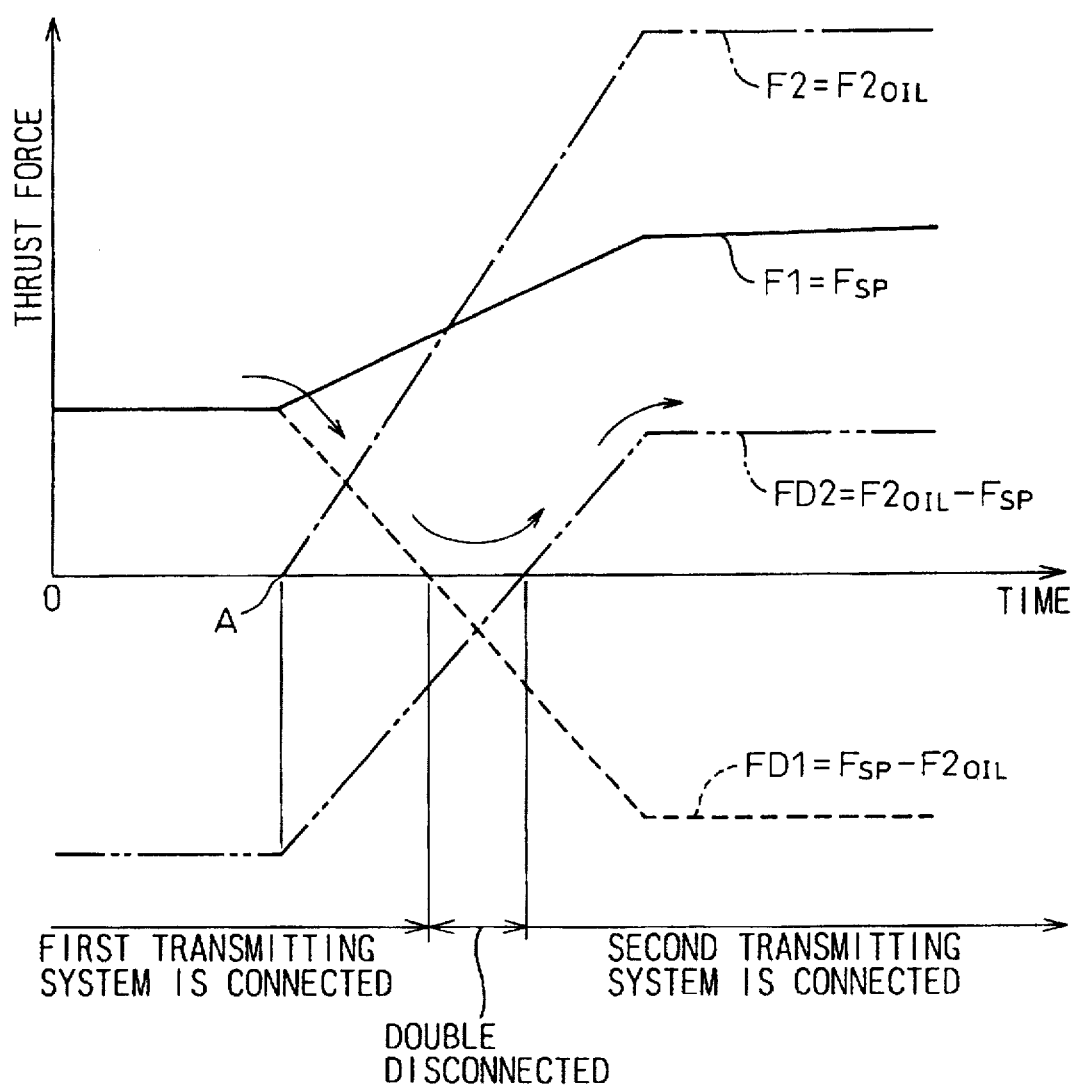

TWIN-CLUTCH-TYPE TRANSMISSION

BACKGROUND OF THE INVENTION

1. Field of the Invention

The present invention relates to a twin-clutch-type transmission and, more particularly, relates to a clutch mechanism which is used therein.

2. Description of the Related Art

A twin-clutch-type transmission is known. In such a twin-clutch-type transmission two transmitting systems for transmitting power are disposed in parallel. One system is composed of a first clutch mechanism and a first gear mechanism connected thereto and having gear sets, to provide a first group of gear ratios. The other system is composed of a second clutch mechanism and a second gear mechanism connected thereto and having gear sets to provide a second group of gear ratios. Gear shifting is performed by changing the power transmission path between these two power transmitting systems.

In such a transmission, the most important matter is a smooth changing of the power transmission path between the first transmitting system and the second transmitting system so as to prevent shift shock.

For the above described purpose, it has been proposed to control the first clutch mechanism and the second clutch mechanism independently by electro-hydraulic means (Japanese Unexamined Patent Publication No. 60-135336). It should be noted that, for smooth gear shifting, it is important to change the engine speed to the value required after gear shifting from the value used before gear shifting so as to prevent a change in vehicle speed.

Therefore, to perform the above described operation desirably, the highest attention must be paid to the times of disengaging and engaging the first and the second clutch mechanisms. The time and the way of engaging the clutch mechanism which is to be engaged after a gear shift is closely connected to the operating condition of the clutch mechanism which was engaged before the gear shift.

However, in the case of the above described system, a complicated control system with high accuracy and accordingly a construction with high accuracy which co-operatingly provides the desired operation of the system is required, because the two clutch mechanisms are independently controlled by electro-hydraulic means as described.

SUMMARY OF THE INVENTION

Therefore, an object of the present invention is to provide a twin-clutch-type transmission which does not require a complicated control system with high accuracy and a construction with high accuracy.

According to the present invention there is provided a twin-clutch-type transmission which comprises a first clutch mechanism, a second clutch mechanism, a first gear mechanism connected to the first output member of the first clutch mechanism, a second gear mechanism connected to the second output member of the second clutch mechanism, a control means, and an interlocking member.

The first clutch mechanism includes an input member, a first output member, a first pressure plate, a first thrust means which engages the first output member to the input member through the first pressure plate. The second clutch mechanism includes an input member, a second output member, a second pressure plate, a second thrust means which engages the second output member to the input member through the second pressure plate.

The first gear mechanism has gear sets to provide a first group of gear ratios. The second gear mechanism has gear sets to provide a second group of gear ratios. The control means controls thrust forces generated by the thrust means so as to change one of the two clutch mechanisms from an engaged condition to a disengaged condition and to change the other of the two clutch mechanism from a disengaged condition to an engaged condition. The interlocking member mechanically interlocks the first pressure plate of the first clutch mechanism and the second pressure plate of the second clutch mechanism.

The present invention will be more fully understood from the description of preferred embodiments of the invention, as set forth below, together with the accompanying drawings.

BRIEF DESCRIPTION OF THE DRAWINGS

In the drawings:

FIG. 5 is a table showing the combination of operating conditions of the two clutches and the two sleeves.

FIG. 6 is a diagram showing a control of changing thrust forces acting on the pressure plates of the clutch systems of the first embodiment in a shift up operation with depressing accelerator pedal.

FIG. 8 is a diagram showing a control of changing thrust forces acting on the pressure plates of the clutch systems of the first embodiment in an instantaneous change.

FIG. 19 is a diagram showing a control of changing the thrust forces acting on the pressure plates of the clutch systems of the fourth embodiment having a double connected period.

FIG. 20 is a diagram showing a control of changing thrust forces acting on the pressure plates of the clutch systems of the fourth embodiment having a double disconnected period.

DESCRIPTION OF THE PREFERRED EMBODIMENT

First of all, the general construction of the embodiment of the present invention will be described.

Figure 1:
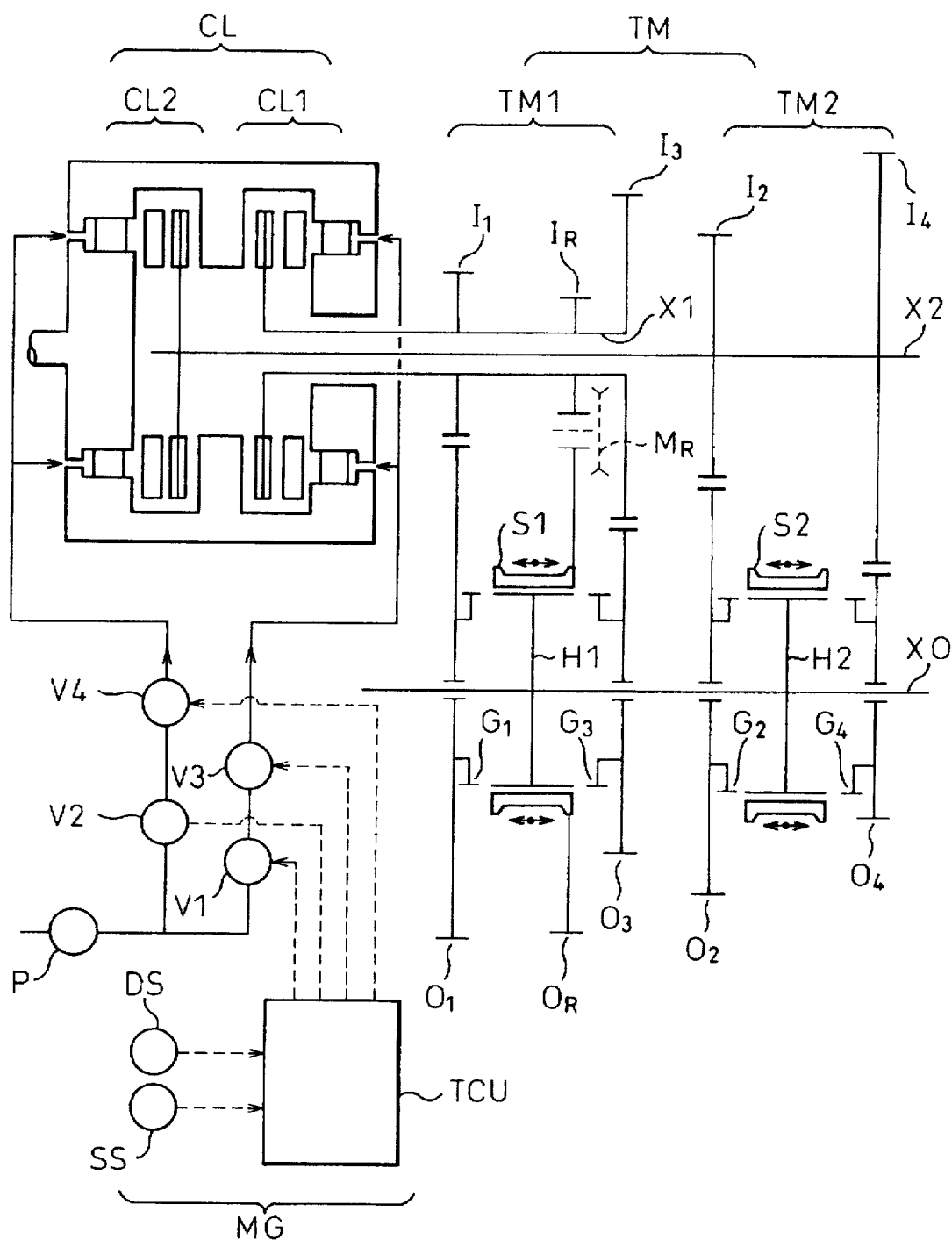
FIG. 1 is a general schematic view of a twin-clutch-type transmission according to the present invention which does not show the interlocking member.

FIG. 1 is a schematic view of the general construction of the embodiment of twin-clutch-type transmission according to the present invention without showing an interlocking member.

In FIG. 1, CL represents a clutch mechanism, TM represents a gear mechanism and MG represents a control mechanism for the clutch mechanism CL.

The clutch mechanism CL is composed of the first clutch mechanism CL1 and the second clutch mechanism CL2 and the gear mechanism TM is composed of the first gear mechanism TM1 having the first group of gear ratios and the second gear mechanism TM2 having the second group of gear ratios. The first clutch mechanism CL1 and the first gear mechanism TM1 compose the first transmitting system. The second clutch mechanism CL2 and the second gear mechanism TM2 compose the second transmitting system.

The first clutch mechanism CL1 and the first gear mechanism TM1, the second clutch mechanism CL2 and the second gear mechanism TM2 are, respectively, serially connected on a power transmitting route.

The first transmitting system and the second transmitting system are disposed in parallel in a power transmitting path.

Hereinafter, a description of each mechanism is given.

At first, gear mechanism shown in FIG. 1 is described.

The gear mechanism is basically composed of an input shaft, an output shaft, a plurality of gear sets for transmitting power from the input shaft to the output shaft with predetermined gear ratios and mechanism to select a transmitting route and these are disposed as shown in FIG. 1 schematically.

The details are described as follows.

X1 represents a first drive shaft which acts as an input shaft of the first gear mechanism TM1 and is connected with the output shaft of the first clutch mechanism CL1.

X2 represents a second drive shaft which acts as an input shaft of the second gear mechanism TM2 and is connected with the output shaft of the second clutch mechanism CL1.

X0 represents a driven shaft which acts as an output shaft of both the first gear mechanism TM1 and the second gear mechanism TM2.

$I_1$, $I_3$ and $I_R$ respectively represent a first gear ratio drive gear, a third gear ratio drive gear, and a reverse drive gear and they are attached to the first drive shaft X1 in a fixed manner.

$I_2$ and $I_4$ respectively represent a second gear ratio drive gear, a fourth gear ratio drive gear and each is attached to the second drive shaft X2 in a fixed manner.

$O_1$ and $O_3$ respectively represents a first gear ratio driven gear, a third gear ratio driven gear and they are rotatably secured to the driven shaft X0 respectively and always mesh with the first gear ratio drive gear $I_1$ and the third gear ratio drive gear $I_3$ respectively. Furthermore, the first gear ratio driven gear $O_1$ and the third gear ratio driver gear $O_3$ respectively have a first gear ratio clutch gear $G_1$ and a third gear ratio clutch gear $G_3$ at the radially midway portion, to selectively engage with a first hub H1.

$O_2$ and $O_4$ respectively represent a second gear ratio driven gear and a fourth gear ratio driven gear and they are rotatably secured to the driven shaft X0 respectively and always mesh with the second gear ratio drive gear $I_2$ and the fourth gear ratio drive gear $I_4$ respectively. Furthermore, the second gear ratio driven gear and the fourth gear ratio driver gear respectively have a second gear ratio clutch gear $G_2$ and a fourth gear ratio clutch gear $G_4$, at the radially midway portion, to selectively engage with a second hub H2.

The first hub H1 is attached to the driven shaft X0 in a fixed manner and slidably secures a first sleeve S1 on a radially outer surface.

The second hub H2 is attached to the driven shaft X0 in a fixed manner and slidably secures a second sleeve S2 on a radially outer surface.

The first sleeve S1 which is slidably secured to the radially outer surface of the first hub H1, as described above, engages the first gear ratio clutch gear $G_1$ engages with the first gear ratio driven gear $O_1$ and the first Hub H1 when first gear ratio is selected, and engages with the third gear ratio clutch gear $G_3$ attached to the third gear ratio driven gear $O_3$ and the first Hub H1 when third gear ratio is selected.

The second sleeve S2 which is slidably secured to radially outer surface of the second hub H2, as described above, engages with the second gear ratio clutch gear $G_2$ attached to the second gear ratio driven gear $O_2$ and the second Hub H2 when second gear ratio is selected, and engages with the fourth gear ratio clutch gear $G_4$ attached to the fourth gear ratio driven gear $O_4$ and the second Hub H2 when fourth gear ratio is selected.

A reverse driven gear $O_R$ is connected to the radially outer side of the first sleeve S1 and is engaged with the reverse driven gear $I_R$ through a reverse idler gear $M_r$ when reverse gear is selected, when the idler gear $M_R$ itself is slid.

The control mechanism MG is composed of a shift selector SS, a shift control unit TCU, a driving condition detecting means DS, a first oil pressure control valve V1, a second oil pressure control valve V2, a third oil pressure control valve V3 and a fourth oil pressure control valve V4, and operates as follows.

The shift control unit TCU controls the first oil pressure control valve V1 and the second oil pressure control valve V2 on the basis of a shift position signal, supplied from shift selector SS, and an signals showing driving condition supplied from driving condition detecting means, for example a signal showing engine speed, throttle angle etc.

Figure 2:
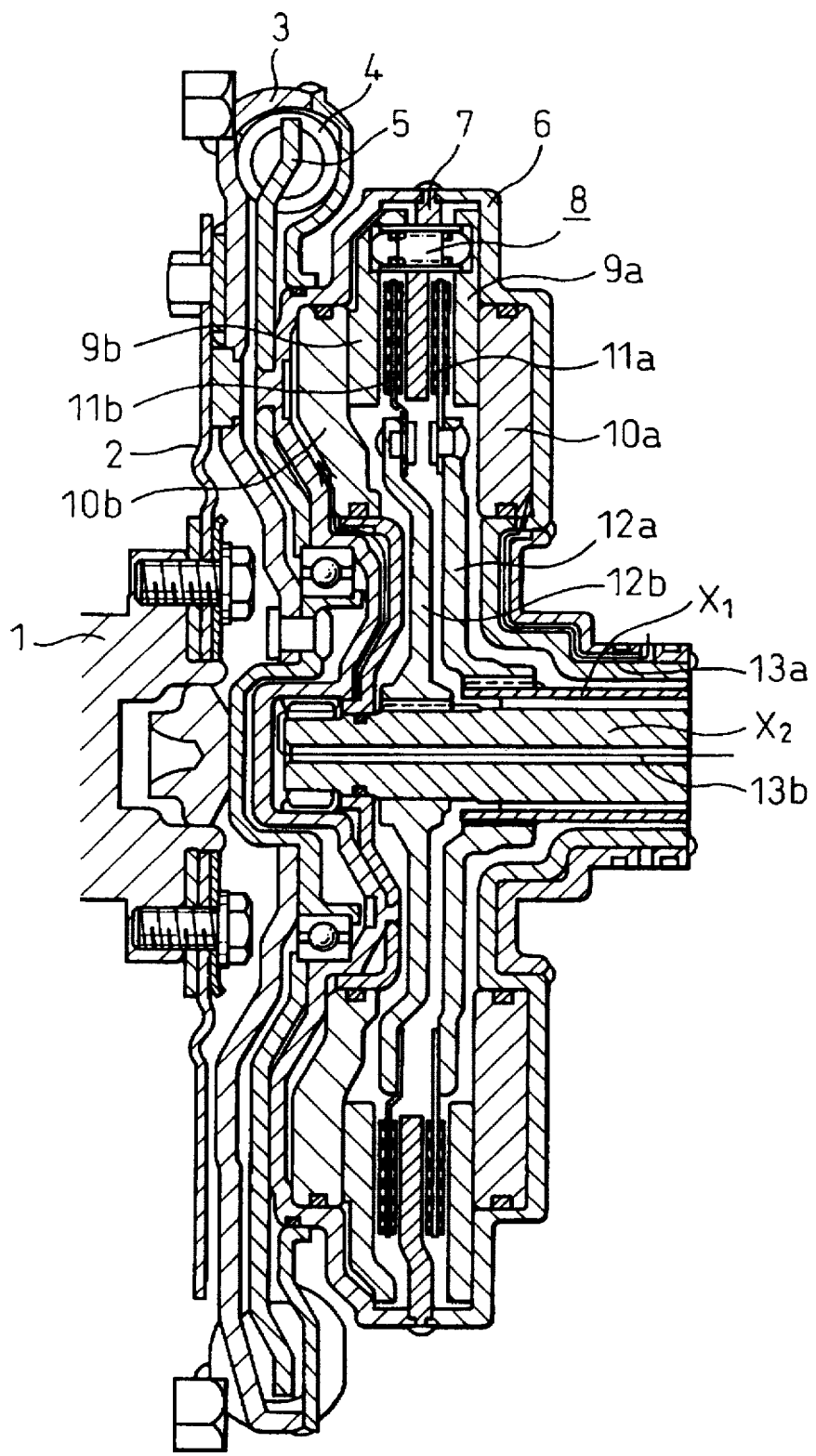
FIG. 2 is a sectional view of the clutch system of the first embodiment.

The details of the clutch mechanism CL are described below. FIG. 2 is a sectional view showing a detail of the clutch mechanism CL of the first embodiment of the present invention.

In FIG. 2, reference numeral 1 represents crank shaft, 2 represents drive plate, 3 represents damper outer shell. The drive plate 2 is attached to the crank shaft 1 and the damper outer shell 3 is attached to the drive plate 2 in a fixed manner.

Reference numeral 4 represents a spring which elastically connects the damper outer shell 3 and a damper driven member 5, and operates to absorb the fluctuation of engine torque. A clutch outer shell 6 is connected to the damper driven member 5 in a fixed manner.

A clutch center plate 7 is attached to the clutch outer shell 6 in a fixed manner. An interlocking member 8 is attached to the clutch center plate 7. Reference numeral 9a represents a first pressure plate, 9b represents a second pressure plate and each respectively contacts a first piston 10a and the second piston 10b at an axially outer end.

When oil pressure is applied to the back surface of the first piston 10a and second piston 10b, the first pressure plate 9a and the second pressure plate 9b are pushed to the axially inner side, even under the biasing force of the spring 82 of the interlocking member 8 (shown in FIG. 3), so that a first clutch disc 11a and a second clutch disc 11b are engaged with the clutch center plate 7. The first clutch disc 11a and the second clutch disc 11b are respectively connected to the first drive shaft X1 and the second drive shaft X2 of the gear mechanism TM through a first connecting disc 12a and a second connecting disc 12b respectively.

Reference numeral 13a and 13b respectively represents a first oil passage and a second oil passage to apply oil pressure to the back surface of the first piston 10a and the second piston 10b.

Figure 3:
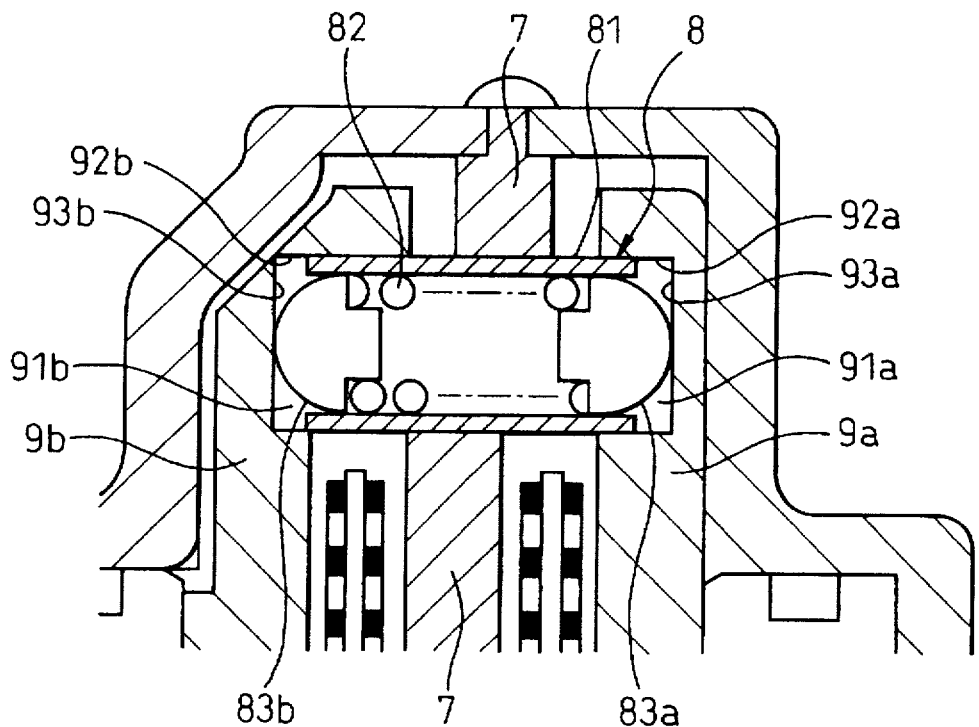
FIG. 3 is a partial sectional view of the interlocking member of the clutch system of the first embodiment.

FIG. 3 is an enlarged view showing a part where the interlocking member 8 is located. The interlocking member 8 is composed of a sleeve 81, a spring 82, a first semi-spherical pin 83a, a second semi-spherical pin 83b. The center part of the interlocking member 8 is connected to the clutch center plate 7 and both end parts of the interlocking member 8 are loosely fitted to a recess 91a and a recess 91b which are respectively formed in the first pressure plate 9a and the second pressure plate 9b so that the outer surface of the sleeve 81 can be kept in a slidable contact with the spherical surface 92a of the recess 91a and the spherical surface 92b of the recess 91b.

The axial length of the sleeve 81 is limited so that the sleeve 81 may not interfere the movement of first pressure plate 9a and second pressure plate 9b any the biasing force of the spring 82 always acts on the first pressure plate 9a and the second pressure plate 9b.

Figure 4:
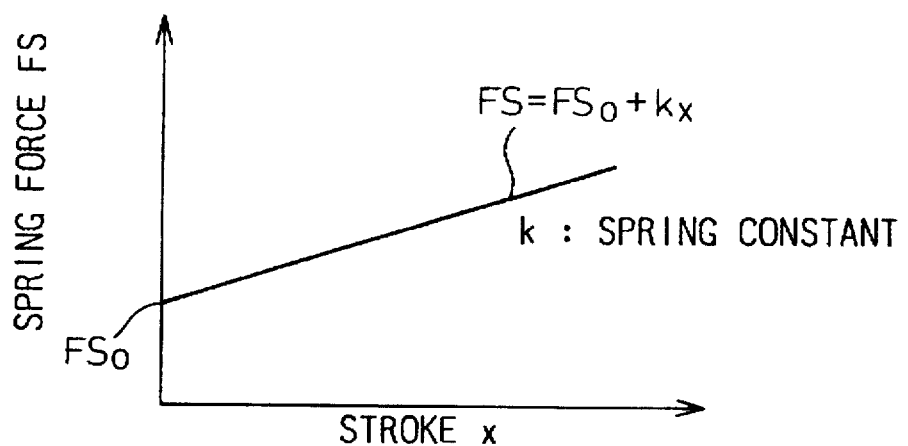
FIG. 4 is a diagram showing the relationship between a spring force and the distance between the two pressure plates of the first embodiment.

FIG. 4 shows a change in the biasing force FS which acts from the spring 82 of the interlocking member 8 to the first pressure plate 9a and second pressure plate 9b when the distance between the bottom surface of the recess 91a of the first pressure plate 9a and the bottom surface of the recess 91b of the second pressure plate 9b is changed.

As shown in FIG. 4, the value of the biasing force FS changes corresponding to the value of change, i.e. stroke x.

FIG. 5 shows a combination of the operation of the first clutch mechanism CL1, the second clutch mechanism CL2, the first sleeve S1 and the second sleeve S2 to attain each gear ratio.

The gear shifting is performed as follows.

A gear shifting from a gear ratio where the first clutch mechanism CL1 is engaged is performed by changing of the power transmitting path by sliding the second sleeve S2 of the second gear mechanism TM2 so as to engage the second gear ratio clutch gear $G_2$ or the fourth gear ratio clutch gear $G_4$ with the second hub H2 and subsequent disengaging of the first clutch mechanism CL1 and engaging of the second clutch mechanism CL2.

A gear shifting from a gear ratio where the second clutch mechanism CL2 is engaged is performed by changing the power transmitting route by sliding the first sleeve S1 of the first gear mechanism TM1 so as to engage the first gear ratio clutch gear $G_1$ or the third gear ratio clutch gear $G_3$ with the first hub H1 and subsequently disengaging of the second clutch mechanism CL2 and engaging of the first clutch mechanism CL1.

In the gear shifting, which is completed by changing the power transmitting route between the two clutch mechanism, as in the present invention, the following three cases may occur according to the relationships between the time of disengaging and engaging of the two clutch mechanisms, i.e. the relationships between the time of disengaging of the clutch which is engaged before the gear shifting and the time of engaging of the clutch which is disengaged before the gear shifting;

(a) A case wherein the engaging of the clutch mechanism, which is disengaged before the gear shifting, starts before the completion of the disengaging of clutch mechanism, which is engaged before the gear shifting, so that the two clutch mechanisms are both engaged for some period, i.e. the two power transmitting routes are completed for some period during the gear shifting.

(b) A case wherein the disengaging of the clutch mechanism, which is engaged before the gear shifting, is completed before starting of the engaging of clutch mechanism, which is disengaged before the gear shifting, so that the two clutch mechanisms are both disengaged for some period i.e. no power transmitting routes are completed for some period during the gear shifting.

(c) A case wherein the engaging of the clutch mechanism, which is engaged after the gear shifting, starts just when the disengaging of clutch mechanism, which is engaged before the gear shifting, is completed, so that the changing of the power transmitting route is performed instantaneously.

Hereinafter, the control of the transmission for smooth shifting in each gear shifting condition are described with consideration of the above description.

(1) Up-shifting with depressing accelerator pedal:

This case is a normal acceleration under high engine power accompanying no down shifting, and attention should be paid to the following.

i) The engine speed before the gear shifting is higher than the engine speed after the gear shifting.
  ii) The accelerator pedal is depressed throughout the gear shifting.

In this case, therefore, the times of engaging and disengaging of the two clutch mechanisms are controlled as aforesaid (a) so as to provide double engaging period in which a resistance is given against the torque generated by depressing the accelerator pedal and accordingly prevent racing of the engine.

FIG. 6 shows a changing pattern of the acting force required for a smooth gear shifting from the second gear speed to the third gear speed, for example.

Shown between "0" to "A" in the horizontal line is an initial state driving with the second gear speed, in which the second clutch mechanism CL2 is engaged and the first clutch mechanism CL1 is disengaged.

An oil pressure corresponding to the driving condition is applied to the back surface of the second piston 10b. A thrust force F2 by the second piston 10b acts on the radially inner part of the second pressure plate 9b with the strength shown between "0" to "A" in the horizontal line. A biasing force FS acts on the radially outer part of the second pressure plate 9b with the strength shown between "0" to "A" in the horizontal line.

Therefore, the second clutch disc 11b is sandwiched between the clutch center plate 7 and the second pressure plate 9b by a disc thrust force FD2=F2–FS with the strength shown between "0" to "A" in the horizontal line so that the second clutch mechanism CL2 is engaged.

On the other hand, the second sleeve S2 in the second gear mechanism TM2 of the gear mechanism TM engages the second gear speed clutch gear $G_2$ disposed on the second gear speed driven gear $O_2$ and the second hub H2.

When a gear shifting signal is input an oil pressure is supplied to the back surface of the first piston 10a of the first clutch mechanism CL1 so that a thrust force F1 of the first piston 10a rises from zero. At this moment the second clutch disc 11b is kept engaged, therefore the distance between the bottom surface 93a of the recess 91a of the first pressure plate 9a and the bottom surface 93b of the recess 91b of the second pressure plate 9b becomes smaller than that of the initial state and the biasing force FS of the spring 82 of the interlocking member 8 becomes greater so that the thrust force FD2=F2–FS begins to decrease at point "A".

In addition, at the same time or beforehand, the first sleeve S1 in the first gear mechanism TM1 of the gear mechanism TM is moved towards the third gear ratio driven gear $O_3$, so that the engaging of the third gear ratio clutch gear $G_3$ disposed on the third gear ratio driven gear $O_3$ and the second hub H1 is completed before the first clutch mechanism CL1 begins the engagement, i.e. before the point "B".

By increasing of the oil pressure which is applied to the back surface of the first piston 10a of the first clutch mechanism CL1, in due course, the thrust force F1 of the first piston 10a overcomes the biasing force FS of the spring 82 and the disc thrust force FD1=F1–FS becomes a positive value so that the first clutch mechanism CL1 begins engaging at point "B".

Subsequently oil pressure is increased so that the first clutch mechanism CL1 is engaged.

Afterwards, the oil pressure, which is applied to the back surface of the second piston 10b, begins to be discharged, so as to decrease the disc thrust force FD2, at point "C".

Then, the distance between the bottom surface 93a of the recess 91a of the first pressure plate 9a and the bottom surface 93b of the recess 91b of the second pressure plate 9b increases. Accordingly, the biasing force FS by the spring 82 of the interlocking member 8 decreases and the disc force FD1 increases.

In due course, the disc thrust force FD2 becomes zero and the second clutch mechanism CL2 is disengaged, so that the second transmitting system is disconnected and a state in which only the first transmitting system is connected is achieved and the gear shifting is completed at point "D".

The second sleeve S2 which engaged the second gear ratio clutch gear $G_2$ located on the second gear ratio driven gear $O_2$ of the second gear mechanism TM of the gear mechanism and the second hub H2 is moved to the free position after the disc thrust force FD2 becomes zero.

Herein, the second sleeve S2 is moved after predetermined period is passed from the point "C" of the beginning of the discharging of the oil pressure applied to the back surface of the second piston 10b, or the oil pressure becomes lower under the predetermined threshold level.

This is because of the difficulty of detecting the time when the disc thrust force FD2 becomes zero.

As described above, the gear shifting is performed following the arrow line in the figure.

Between points "B" and "C", the second clutch mechanism CL2 and the first clutch mechanism CL1 are both engaged, and the first sleeve S1 of the first gear mechanism TM1 which connected to the first clutch mechanism CL1 engages the third gear ratio clutch gear $G_3$ located on the third gear ratio driven gear $O_3$ and the first hub H1, and the second sleeve S2 of the second gear mechanism TM2 which is connected to the second clutch mechanism CL2 engages the second gears ratio clutch gear $G_2$ located on the second gear ratio driven gear $O_2$ and the second hub H2. Thus, this period is a state where the first power transmitting system and the second power transmitting system are both connected, i.e. a double connected state.

During this time, a circulation of power occurs, so than the racing of the engine is prevented by the circulating torque, of which the strength is defined by the smaller one among the torques transmitted by the two clutch mechanism, and smooth gear shifting is attained.

If the clutch which is engaged before the gear shifting, i.e. the clutch which is disengaged after gear shifting, is disengaged too early, or if the clutch which is disengaged before the gear shifting, i.e. the clutch which is engaged after gear shifting, is engaged too late, engine racing occurs because the load on the engine is suddenly decreased when the accelerator pedal depressed, and subsequently the engine speed is decreased with a engagement of the clutch which is disengaged before the gear shifting, so that a shock occurs to the extent of the inertia of the engine.

(2) Down-shifting with depressing accelerator pedal:

This case is a rapid acceleration under high engine power accompanying down shifting, and attention should be paid to the following.

i) The engine speed before the gear shifting is lower than the engine speed after the gear shifting.

ii) The accelerator pedal is depressed throughout the gear shifting.

In this case, therefore, the times of engaging and disengaging of the two clutch mechanisms are controlled as aforesaid (b), so as to attain a double disconnected period of the two transmitting systems, and increase the engine speed by ensuring that the accelerator pedal is depressed throughout the gear shifting as shown in the above ii).

Figure 7:
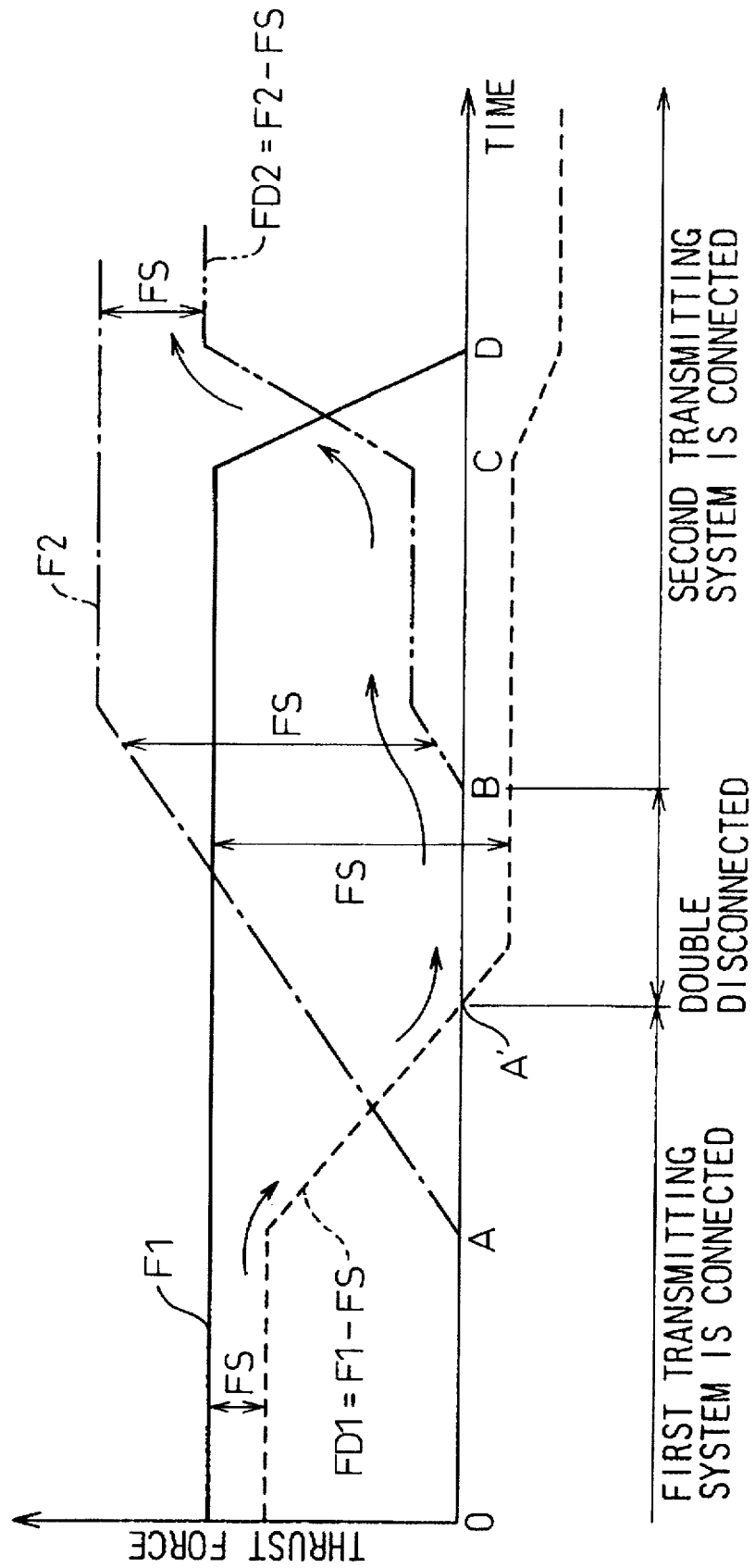
FIG. 7 is a diagram showing a control of changing thrust forces acting on the pressure plates of the clutch systems of the first embodiment in a shift down operation with depressing accelerator pedal.

FIG. 7 shows a required pattern of the change of the acting force for a smooth gear shifting from the third gear ratio to the second gear ratio, for example.

Shown between "0" to "A" in the horizontal line is a initial state of driving with the third gear ratio, in which the first clutch mechanism CL1 is engaged and the second clutch mechanism CL2 is disengaged.

An oil pressure corresponding to the driving condition is applied to the back surface of the first piston 10a. A thrust force F1 by the first piston 10a acts on the radially inner part of the first pressure plate 9a with a strength shown between "0" to "A" in the horizontal line. A biasing force FS of the spring 82 of the interlocking member 8 acts on the radially outer part of the first pressure plate 9a with a strength shown between "0" to "A" in the horizontal line.

Therefore, the first clutch disc 11a is sandwiched between the clutch center plate 7 and the first pressure plate 9a by a disc thrust force FD1=F1=FS with a strength shown between 0 to A in the horizontal line so that the first clutch mechanism CL1 is engaged.

The thrust force F1 produced by the first piston 10a shown in FIG. 7 is very different from the thrust force F2 produced by the second piston 10b shown in FIG. 6 because of the difference of the driving condition.

Instead of it being intended to perform normal acceleration with up-shifting from the second gear ratio on the case shown in FIG. 6, it is intended to perform rapid acceleration with down-shifting from the third gear ratio in the case shown in FIG. 7.

These different situation are detected by the driving condition detecting means DS and, using the signals therefrom, the transmission control unit TCU adjusts the extent of opening of the first oil pressure control valve V1 so as to attain the optimum initial oil pressure to perform the desired gear shifting.

In this condition, the first sleeve S1 in the first gear mechanism TM1 of the gear mechanism TM engages the third gear ratio clutch gear $G_3$ disposed on the third gear ratio driven gear $O_3$ and the first hub H1.

When a gear shifting signal is input, oil pressure is applied to the back surface of the second piston 10b of the second clutch mechanism CL2 so that thrust force F2 of the second piston 10b rises from zero. At this moment the first clutch disc 11a is kept engaged, therefore the distance between the bottom surface 93a of the recess 91a of the first pressure plate 9a and the bottom surface 93b of the recess 91b of the second pressure plate 9b becomes smaller than that of the initial state, and the biasing force FS of the spring 82 of the interlocking member 8 becomes greater, so that the thrust force FD1=F1-FS begins to decrease at point "A".

In addition, at the same time or beforehand, the second sleeve S2 in the second gear mechanism TM2 of the gear mechanism TM is moved towards the second gear ratio driven gear $O_2$, so that the engaging of the second gear ratio clutch gear $G_2$ disposed on the second gear ratio driven gear $O_2$ and the second hub H2 is completed before the second clutch mechanism CL2 begins the engagement, i.e. before the point "B".

By increasing of the oil pressure applied to the back surface of the second piston 10b of the second clutch mechanism CL2, in due course, the increased biasing force FS of the spring 82 overcomes the thrust force F1 of the first piston 10a and the disc thrust force FD1=F1-FS turns to a negative value so that the first pressure plate 9a is moved to the right and the first clutch mechanism CL1 is disengaged at point "A".

By further increasing of the oil pressure the thrust force F2 of the second piston 10b overcomes the biasing force FS of the spring 82 and the disc thrust force FD2=F2-FS changes to a positive value so that the second clutch mechanism CL2 begins to engage at point "B".

Subsequently oil pressure is further increased so that the second clutch mechanism CL1 is engaged.

Afterwards, the oil pressure which is applied to the back surface of the first piston 10a begins to be discharged at "C".

Then, the distance between the bottom surface 93a of the recess 91a of the second pressure plate 9a and the bottom surface 93b of the recess 91b of the second pressure plate 9b increases corresponding that the thrust force F1 of the first pressure plate 9a decreases. Correspondingly, the biasing force FS by the spring 82 of the interlocking member 8 decreases. The disc thrust force FD2 which pushes the second clutch disc 11b to be engaged increases and converges to a certain level in due course. Thus the gear shifting is completed at point "D".

Subsequently, as in the aforesaid case (1), the first sleeve S1, which has engaged the first hub H1 and the third gear ratio speed clutch gear $G_3$ located on the third gear ratio driven gear $O_3$ in the first gear mechanism TM1 of the gear mechanism TM, is moved to the free position.

As described above, the gear shifting is performed following the arrow line in the figure.

During a period between points "A'" and "B", the first clutch mechanism CL1 is disengaged and the second clutch mechanism CL2 is not yet engaged so that the both clutch mechanisms are disengaged and, on the other hand, the accelerator pedal is kept depressed. Therefore, a circulation of power occurs, so that the engine speed increases. Accordingly, the second clutch mechanism CL2 is engaged at high engine speed which corresponds to the second gear ratio and shift shock does not occur.

If the clutch which is engaged before the gear shifting, i.e. the clutch which is disengaged after gear shifting, is disengaged too late, or the clutch which is disengaged before the gear shifting, i.e. the clutch which is engaged after gear shifting, is engaged too early, the engine speed does not increase sufficiently, therefore engine braking is generated and accordingly shift shock will occur.

In the above description, the transmission is so controlled that both transmitting systems are disconnected for some period.

However, what is necessary is that engine torque overcomes the engaging torque of the clutch mechanism of the transmitting system which have been connected so that engine speed can increase to the value required after the gear shifting, when the engaging torque decreased during the gear shifting. Therefore, it is not necessarily required to have a period during which the two clutch mechanisms are completely disengaged.

(3) Up-shifting without depressing accelerator pedal:

This case is a slow acceleration under low engine power accompanying up shifting, as driving on down hill road, and attention should be paid to the following.

i) The engine speed before the gear shifting is higher than the engine speed after the gear shifting.
  ii) The accelerator pedal is not depressed throughout the gear shifting.

In this case, therefore, the times of engaging and disengaging the two clutch mechanisms are controlled as aforesaid (b) so as to attain double disconnected period of the two transmitting system, and decrease the engine speed by using that the accelerator pedal is not depressed throughout the gear shifting as described above in ii).

The required changing pattern of the thrust force to enable the above described gear shifting is substantially the same as the pattern shown in FIG. 7 relating to the case (2), therefore, herein, no new figure is provided.

However, it is required that the both two transmitting systems are kept disconnected until the engine speed naturally decreases to the required level. The required period is a little longer than the case (2).

Therefore, in this case, the piston thrust force of the clutch which is disengaged before the gear shifting, i.e. which is engaged after gear shifting, is moderately increased so that the double disengaged period can be lengthened.

(4) Down-shifting without depressing accelerator pedal:

This case is, for example, a deceleration on a flat road without depressing the accelerator pedal, and attention should be paid to the following.

i) The engine speed before the gear shifting is lower than the engine speed after the gear shifting.

ii) The accelerator pedal is not depressed throughout the gear shifting.

In this case, therefore, the times of engaging and disengaging the two clutch mechanisms are controlled as aforesaid (a) so as to attain a double connected period of the two transmitting system.

However, it is required to moderately engage the clutch mechanism which has been disengaged before the gear shifting, i.e. which is engaged after the gear shifting, so as to minimize the effect on the transmitting system which is connected before the gear shifting and to raise the engine speed as moderately as possible, to prevent an engine braking occurring suddenly.

The required changing pattern of the thrust force for enabling the above described gear shifting is substantially same as the pattern shown in FIG. 6 relating to the case (1), therefore, herein, no new figure is provided.

However, to minimize the effect on the transmitting system which is connected before the gear shifting, i.e. the transmitting system which is disconnected after the gear shifting, the piston thrust force on the clutch mechanism which is engaged before the gear shifting, i.e. which is disengaged after the gear shifting, is decreased so that a decrease the extent of the double connection, i.e. the overlapping of the torque, and the piston thrust force of the clutch mechanism which is disengaged before the gear shifting, i.e. which is engaged after the gear shifting, is moderately increased, so that a double connecting period is lengthened and accordingly the engine speed rises as little as possible.

FIG. 8 shows a case where the engagement of the clutch mechanism which has been disengaged before the gear shifting, and the disengagement of the clutch mechanism which has been engaged before the gear shifting are simultaneously performed so that the gear shifting is instantaneously completed.

The above described instantaneous gear shifting is performed at the point "A'" in the figure.

According to the first embodiment of the present invention, as described above, the overlapping of the torque can be controlled by only adjusting the oil pressure which is applied to the clutch which has been engaged before the gear shifting, and the period of the overlapping of the torque can be controlled by only adjusting the oil pressure which is applied to the clutch which is engaged after the gear shifting, so that control corresponding to the required gear shifting is attained.

FIGS. 9a through 9d show the states inside the clutch mechanism CL in the above described cases.

Figure 9A:
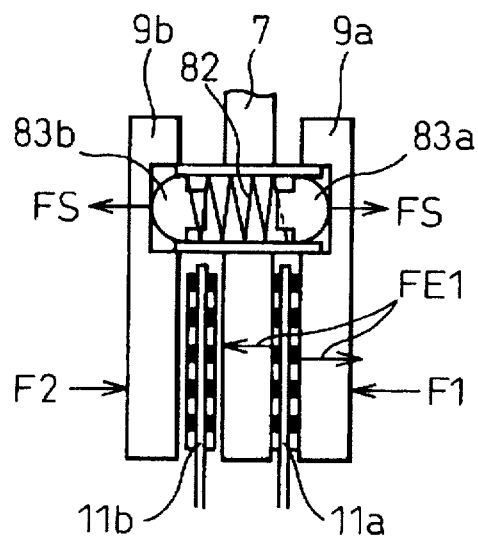
FIG. 9a is a partial sectional view of the clutch system of the first embodiment when the first clutch is engaged and the second clutch is disengaged.

FIG. 9a shows a status where the first clutch mechanism CL1 is engaged and the second clutch mechanism CL2 is disengaged.

Figure 9B:
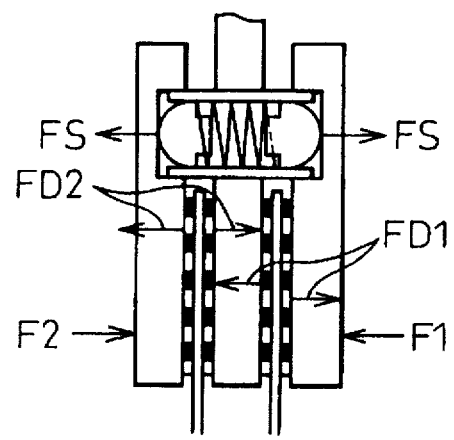
FIG. 9b is a partial sectional view of the clutch system of the first embodiment when the fist clutch and the second clutch are both engaged.

FIG. 9b shows a status where the first clutch mechanism CL1 and the second clutch mechanism CL2 are both engaged.

Figure 9C:
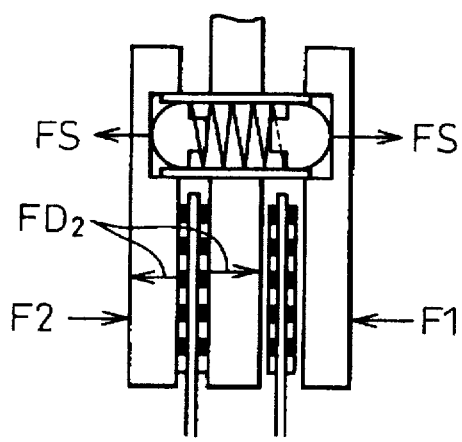
FIG. 9c is a partial sectional view of the clutch system of the first embodiment when the first clutch is disengaged and the second clutch is engaged.

FIG. 9c shows a status where the first clutch mechanism CL1 is disengaged and the second clutch mechanism CL2 is engaged.

Figure 9D:
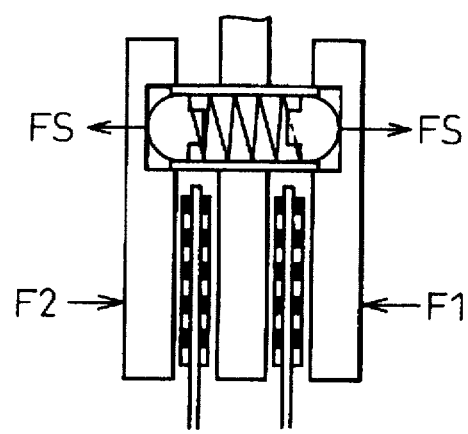
FIG. 9d is a partial sectional view of the clutch system of the first embodiment when the first clutch and the second clutch are both disengaged.

FIG. 9d shows a status where the first clutch mechanism CL1 and the second clutch mechanism CL2 are both disengaged.

Figure 10:
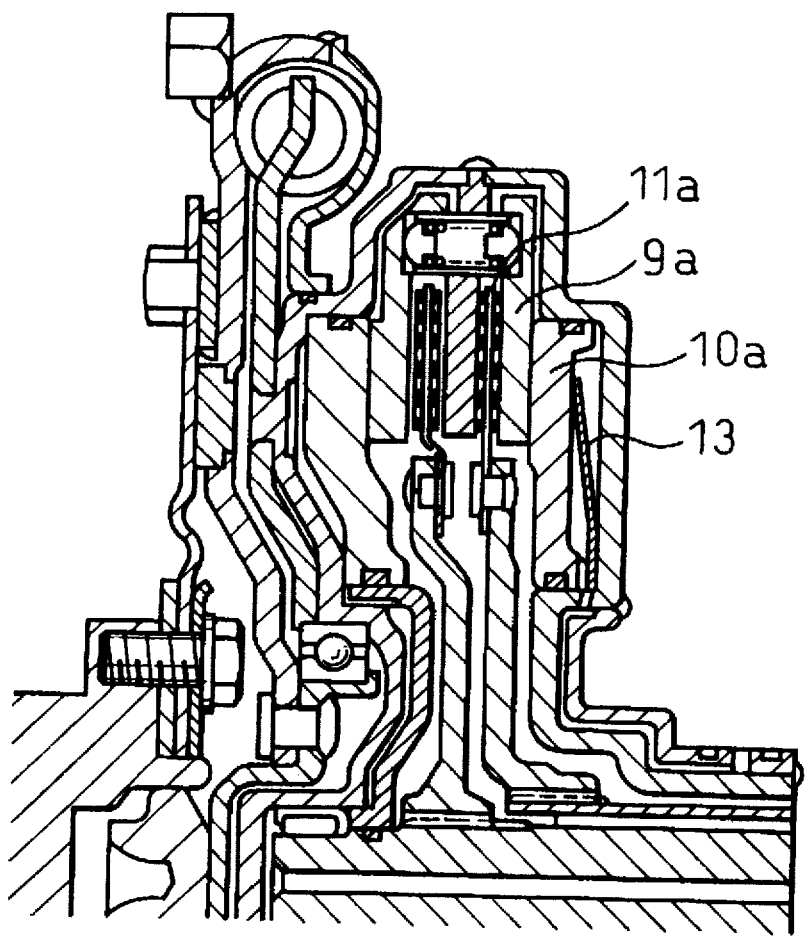
FIG. 10 is a sectional view of the clutch system of the second embodiment.

FIG. 10 shows the construction of the second embodiment of the present invention. In this second embodiment an elastic member 13 is attached to the back surface of the first piston 10a compared to the first embodiment. An elastic force of the elastic member 13 always biases the first pressure plate 9a to engage with the first clutch disc 11a.

The operation of the second embodiment at each driving condition is substantially the same as in the first embodiment. The only difference is that the thrust force F1, in the descriptions of the operations of the first embodiment, is replaced with $F_{SP}+F_{OIL}$.

Wherein, $F_{SP}$ is a thrust force from the elastic member 13 and $F_{OIL}$ is a thrust force from the oil pressure.

Figure 11:
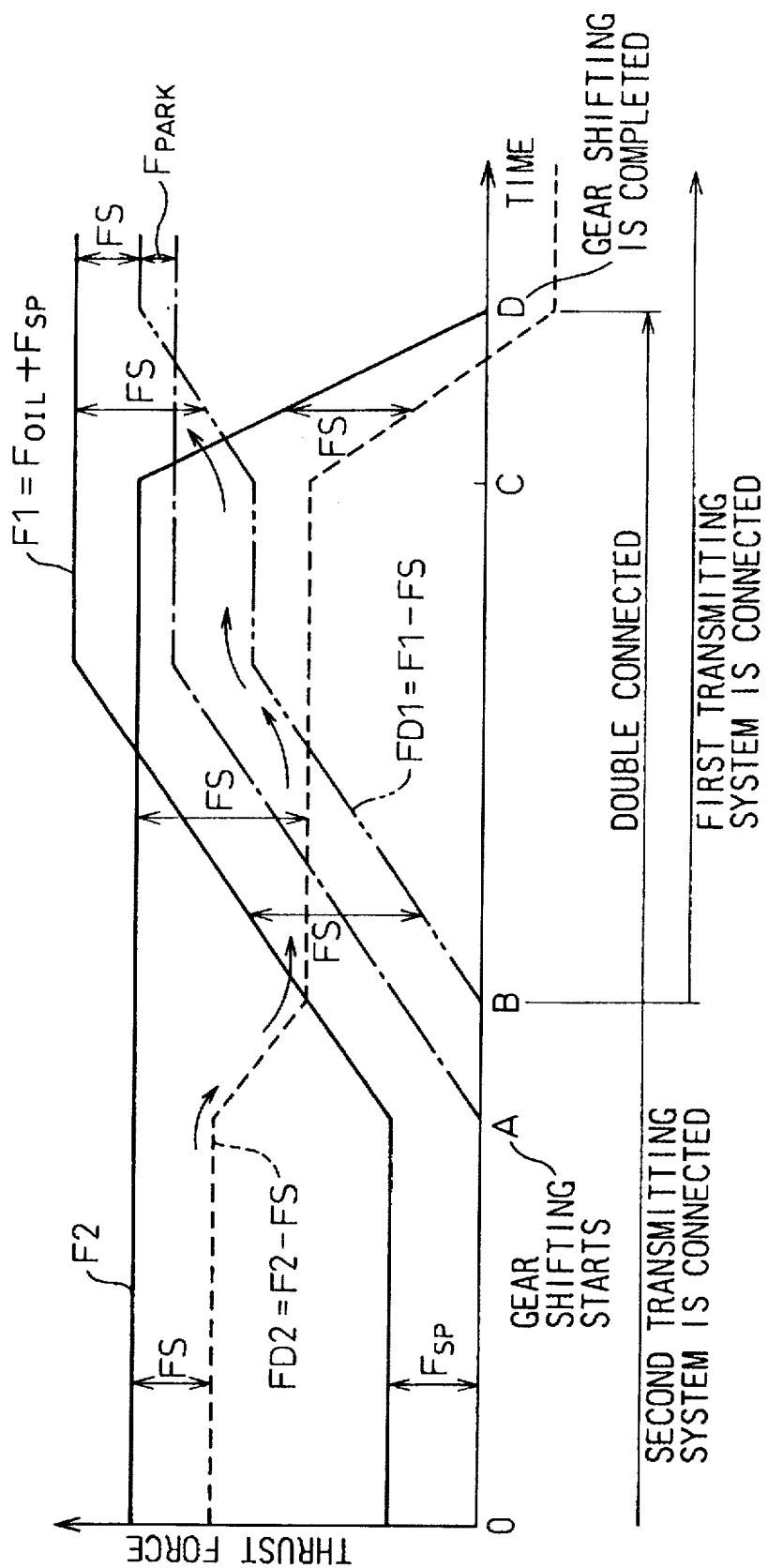
FIG. 11 is a diagram showing a control of changing the thrust forces acting on the pressure plates of the clutch systems of the second embodiment having a double connected period.

FIG. 11 is an operating chart of the second embodiment to attain a double connected condition when the first transmitting system, which has the first clutch mechanism CL1 on which the thrust force of the elastic member 13 acts, is connected after a gear shift.

Figure 12:
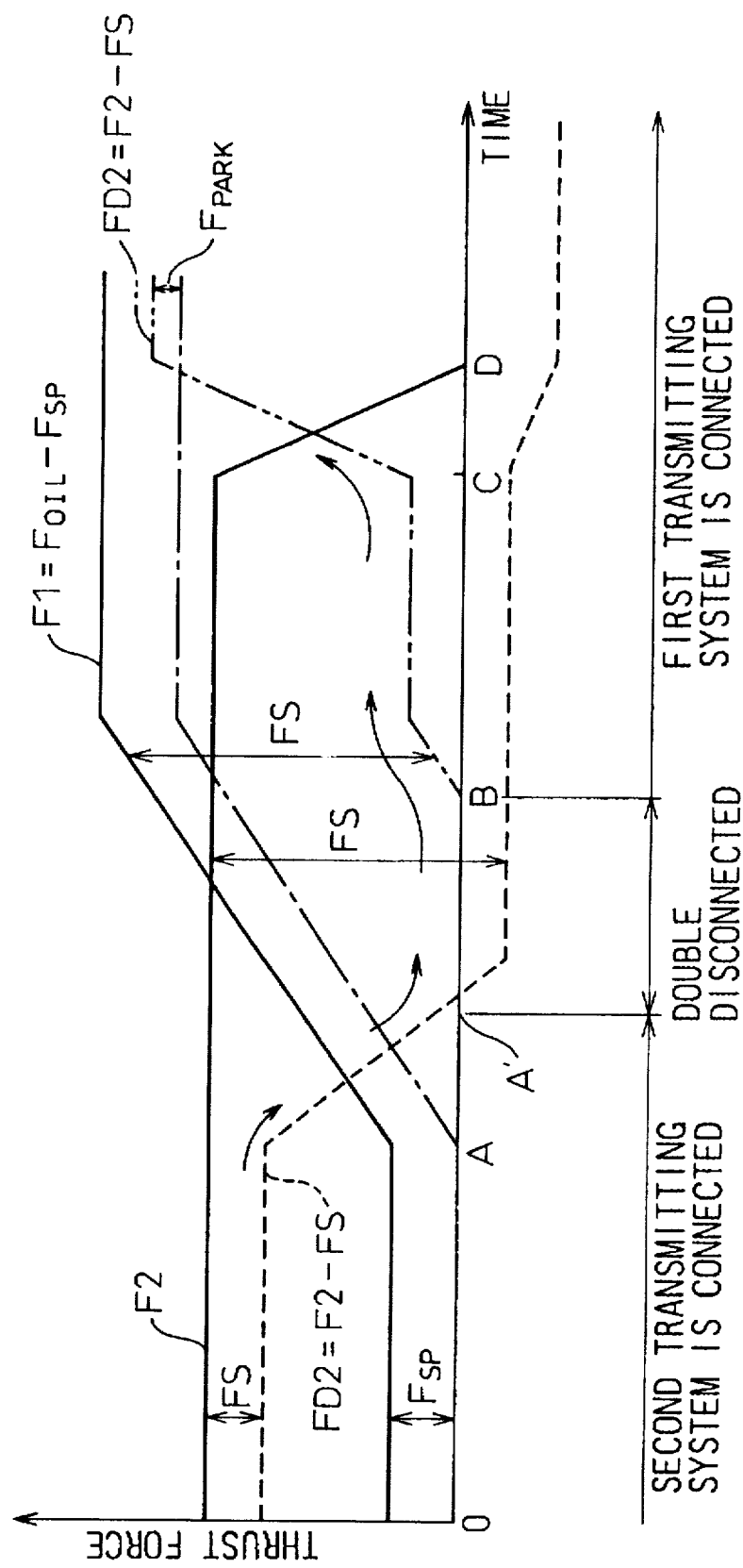
FIG. 12 is a diagram showing a control of changing the thrust forces acting on the pressure plates of the clutch systems of the second embodiment having a double disconnected period.

FIG. 12 is an operation chart of the second embodiment to attain double disconnected condition.

Figure 13:
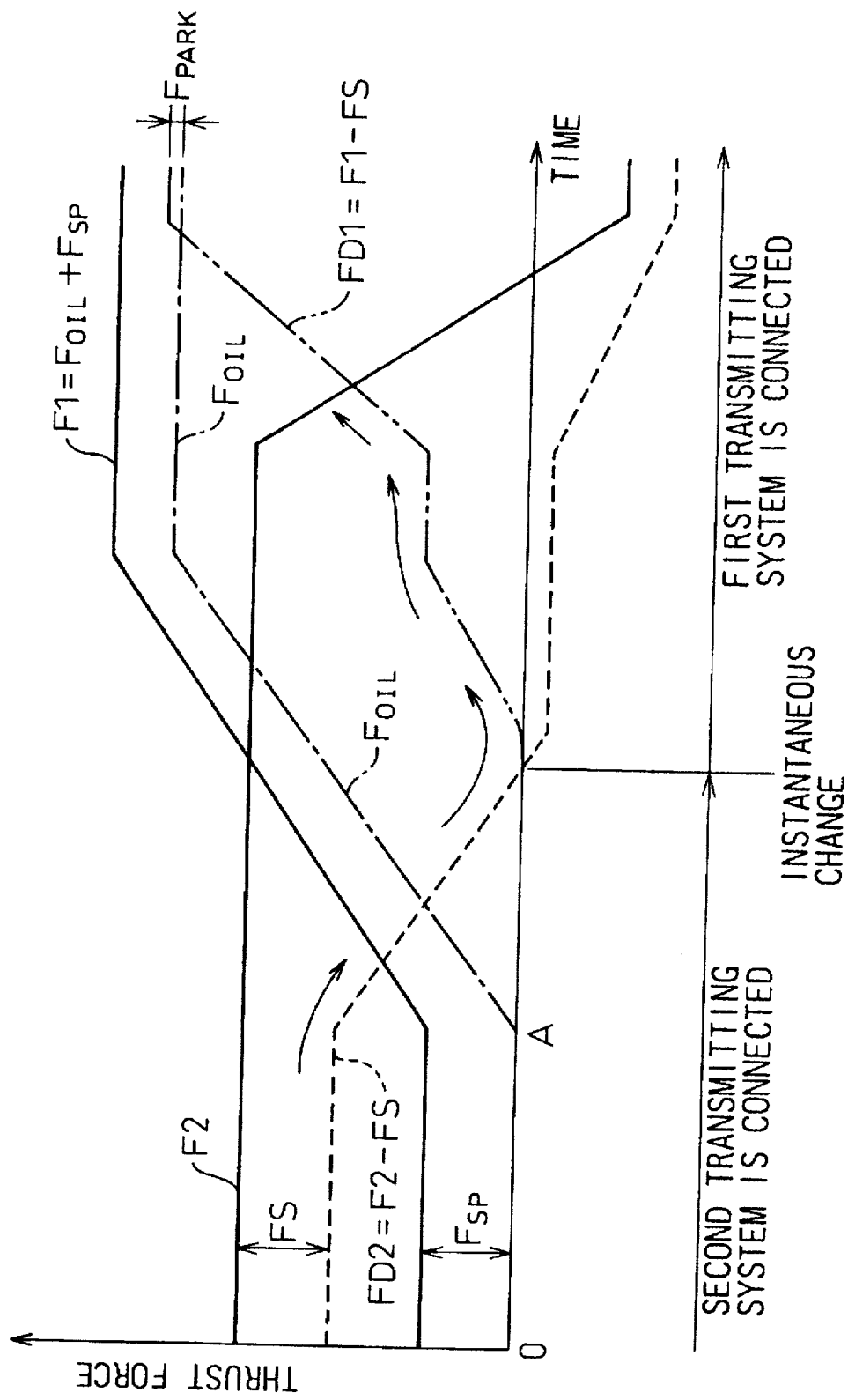
FIG. 13 is a diagram showing a control of changing the thrust forces acting on the pressure plates of the clutch systems of the second embodiment in an instantaneous change.

FIG. 13 is an operation chart of the second embodiment to attain instantaneous change.

In each figure, the point "A" is the starting point of applying the oil pressure to the first piston 10a of the first clutch mechanism CL1 of the first transmitting system which is connected after the gear shifting. Then, the power transmitting route is changed from the second transmitting system to the first transmitting system, following the arrow line in each figures.

If the first transmitting system, which has the first clutch mechanism CL1 on which the thrust force of the elastic member 13 acts, is connected before the gear shifting, the operation is done by following the arrow line in the reverse direction.

There are the following features in the operation of the second embodiment.

One is that the thrust force $F_{SP}$, of the elastic member 13, acts on the first pressure plate 9a of the first clutch mechanism CL1 prior to the thrust force $F_{OIL}$, by oil pressure, starts.

The other is that, the disc thrust force FD1 is greater than the thrust force $F_{OIL}$ from the oil pressure when the second clutch mechanism CL2 is disengaged and only the first clutch mechanism CL1 is engaged after completion of the gear shifting, and $F_{PARK}$ which means the difference between the thrust force FD1 and the thrust force $F_{OIL}$ keeps acting to engage the first clutch mechanism CL1 and accordingly keep the first transmitting system in a connected condition, after the engine is stopped.

Therefore, the vehicle can be stopped if a shift lever is positioned in the position of first gear speed group.

Thus, the second embodiment of the present invention, can have a "PARK" function.

Figure 14:
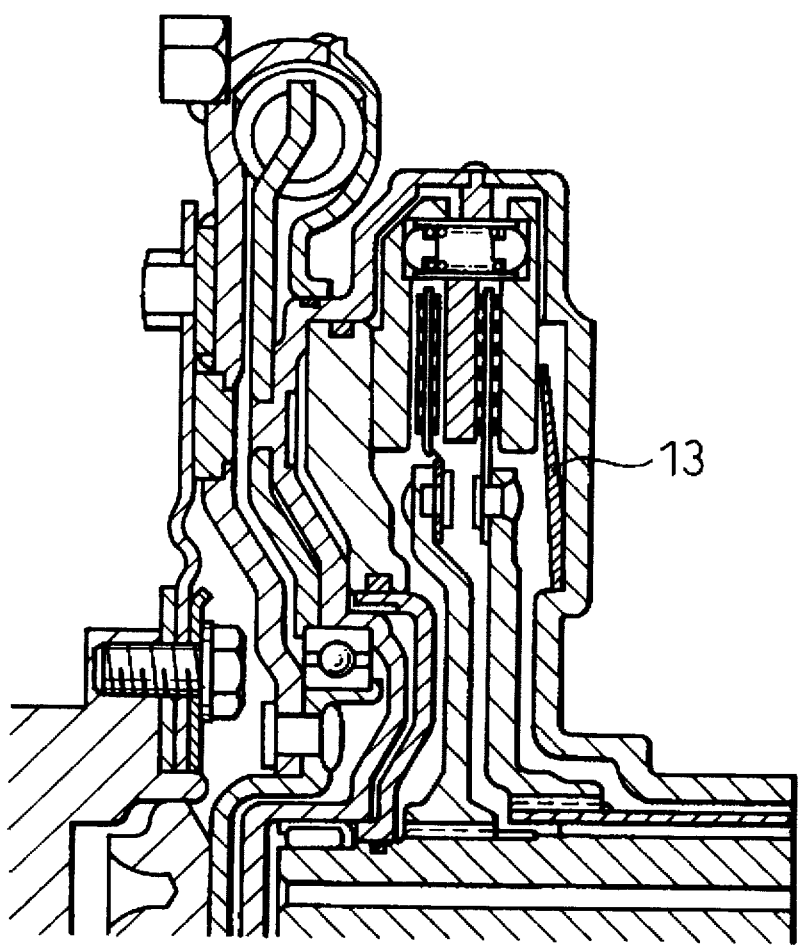
FIG. 14 is a sectional view of the clutch system of the third embodiment.

FIG. 14 shows the construction of the third embodiment of the present invention. In this third embodiment the mechanism for applying the oil pressure to the first clutch mechanism CL1 is deleted compared to the second embodiment.

Therefore, only the thrust force $F_{SP}$ of the elastic member 13 acts on the first clutch disc 11a. Accordingly, the disc thrust force FD1 of the first clutch mechanism CL1 equals to $F_{SP}$–FS, and the disc thrust force FD2 of the second clutch mechanism CL2 equals to $F_{OIL}$–FS.

Figure 15:
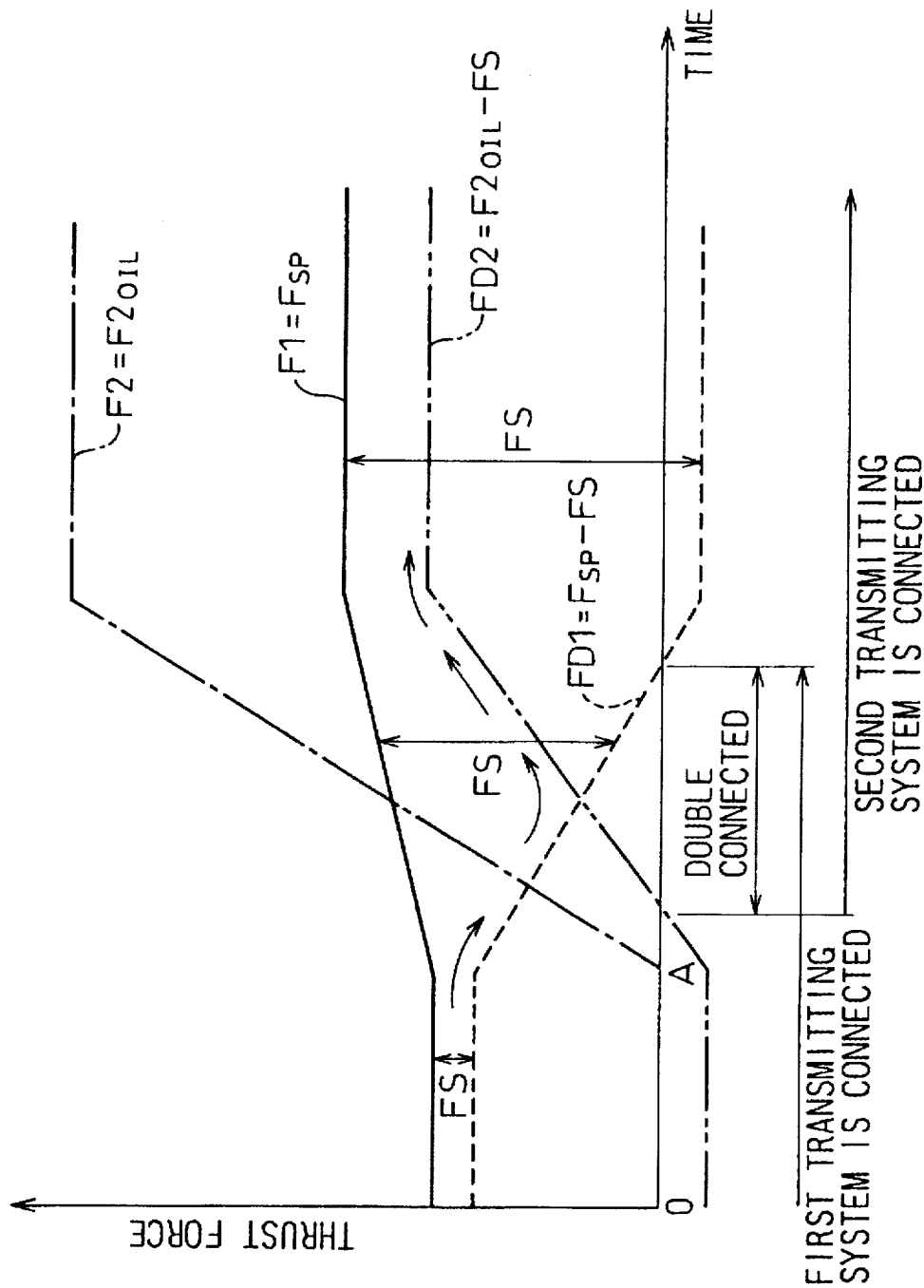
FIG. 15 is a diagram showing a control of changing the thrust forces acting on the pressure plates of the clutch systems of the third embodiment having a double connected period.

FIG. 15 is an operation chart of the third embodiment to attain double connected conditions when the first transmitting system having the first clutch mechanism CL1, on which only the thrust force of the elastic member 13 acts, is connected before the gear shifting.

Figure 16:
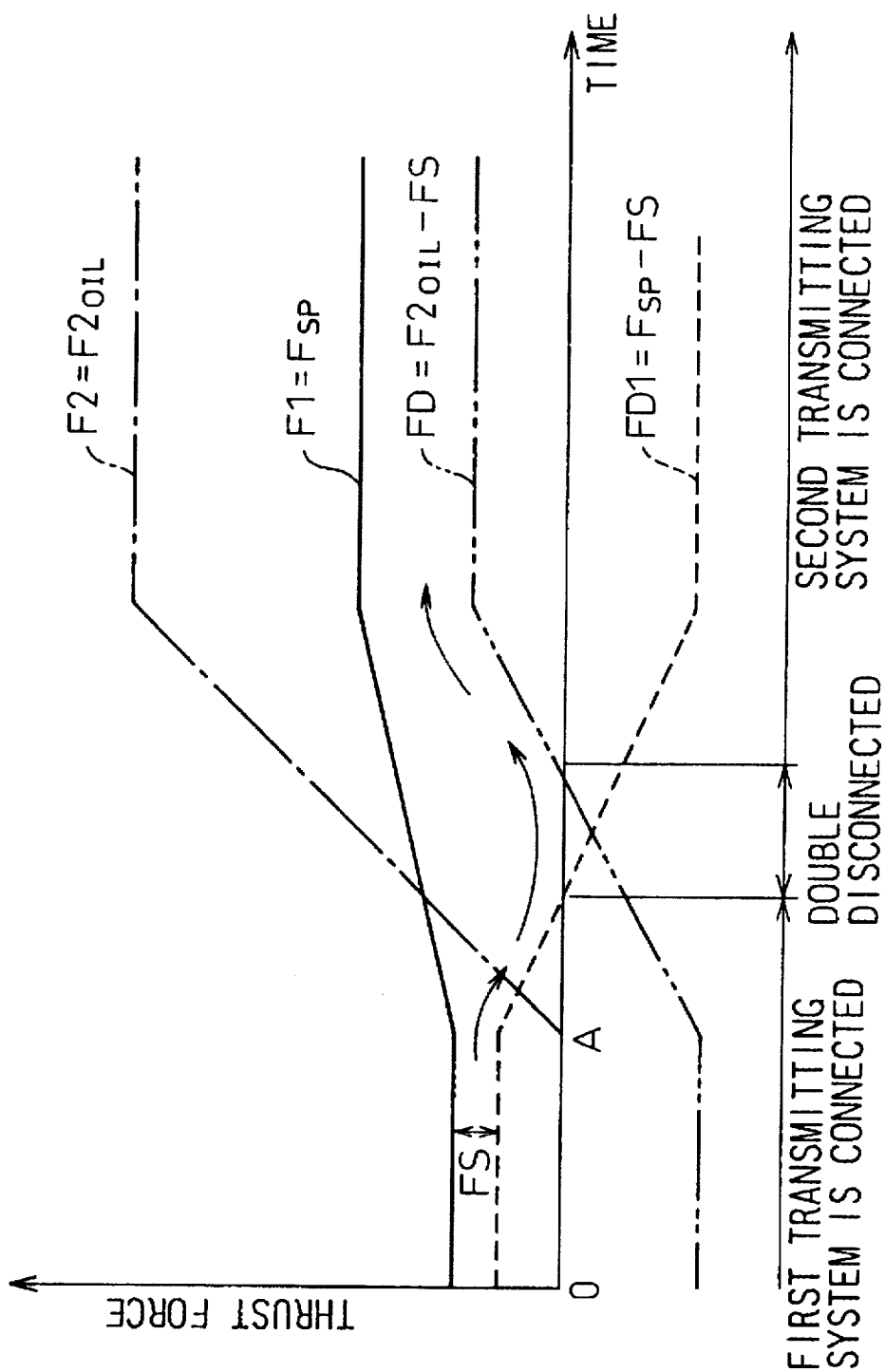
FIG. 16 is a diagram showing a control of changing the thrust forces acting on the pressure plates of the clutch systems of the third embodiment having a double disconnected period.

FIG. 16 is an operation chart of the third embodiment attaining a double disconnected condition.

Figure 17:
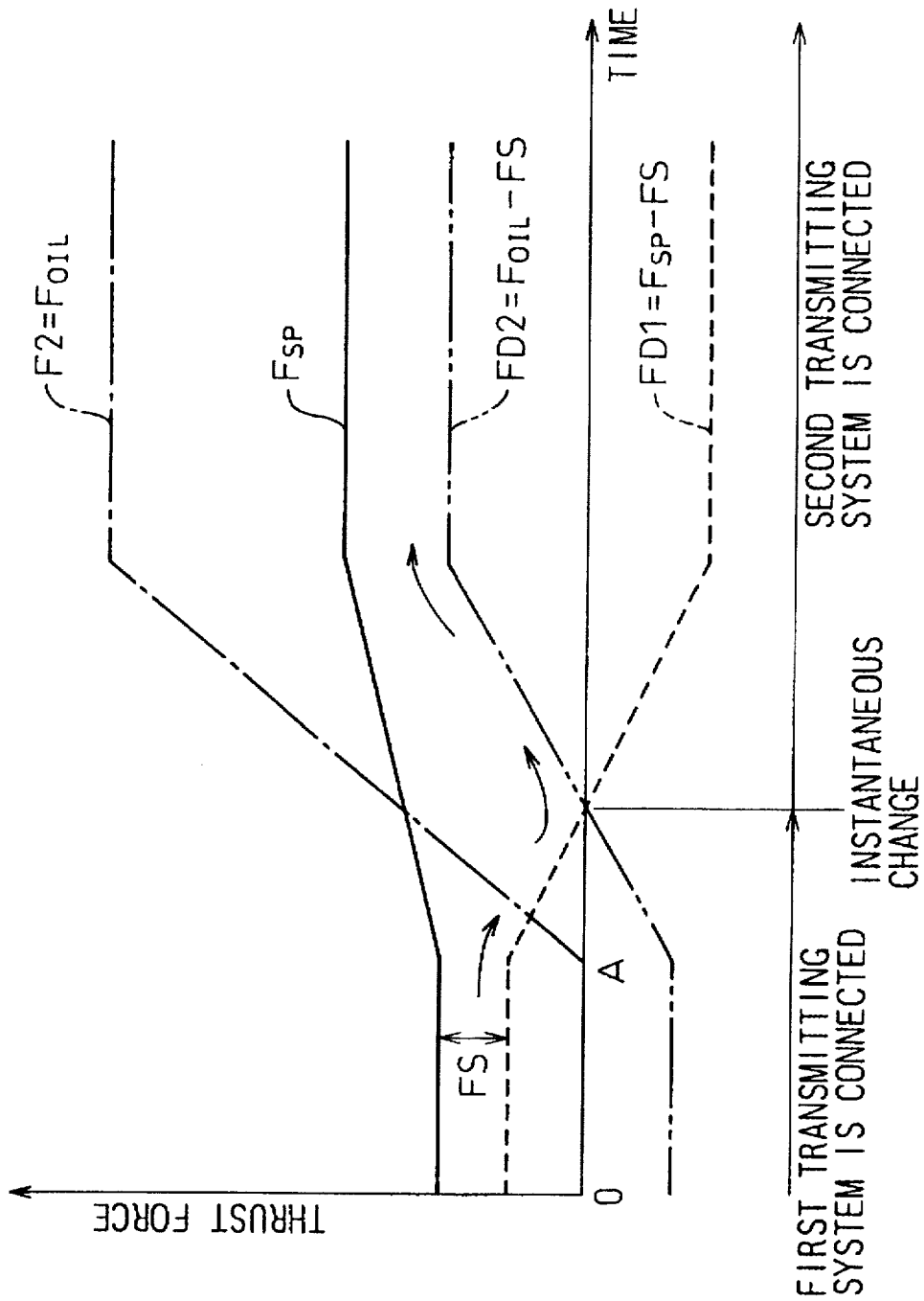
FIG. 17 is a diagram showing a control of changing the thrust forces acting on the pressure plates of the clutch systems of the third embodiment in an instantaneous change.

FIG. 17 is an operation chart of the third embodiment attaining an instantaneous change.

In each figure, the point "A" is the starting point of applying the oil pressure to the second piston 10b of the second clutch mechanism CL2 of the second transmitting system which is connected after the gear shifting. Then, the transmitting system is changed from the first transmitting system to the second transmitting system following the arrow line in each figure.

If the first transmitting system which includes the first clutch mechanism CL1 on which the thrust force of the elastic member 13 acts is engaged after gear shifting, each operation can be done by following the arrow line in the reverse direction.

In the third embodiment, the mechanism for applying the oil pressure to the first clutch mechanism CL1 is deleted, with the first piston 10a, therefore, the corresponding axial length can be reduced compared to the second embodiment. As a result, the device can be made lighter and smaller.

Figure 18A:
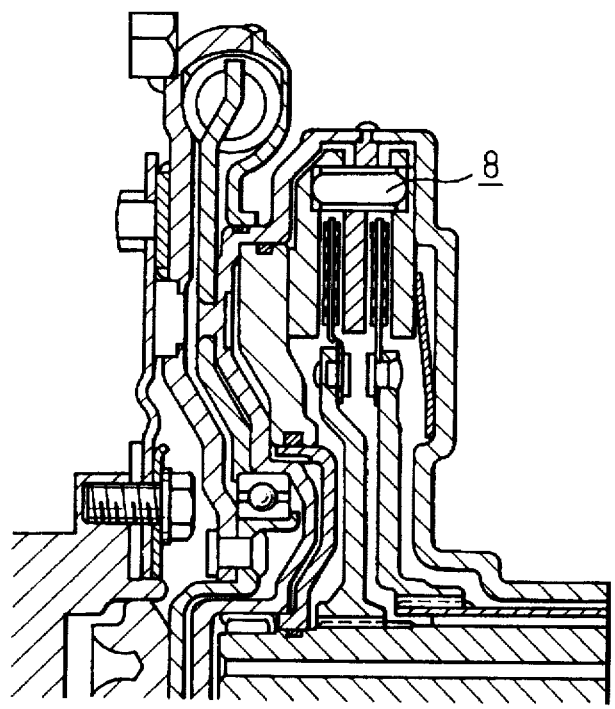
FIG. 18a is a sectional view of the clutch system of the fourth embodiment.
Figure 18B:
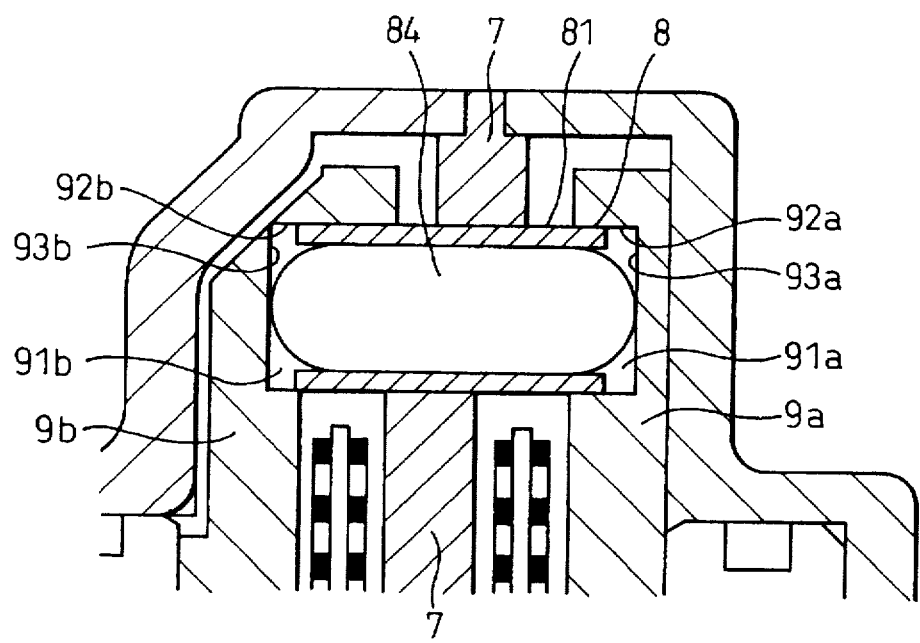
FIG. 18b is a partial sectional view of the connecting member of the clutch system of the fourth embodiment.

FIG. 18a shows the general construction of the clutch mechanism of the fourth embodiment of the present invention and FIG. 18b shows details of the interlocking member 8 of the fourth embodiment.

In the fourth embodiment of the present invention, the spring 82, the first semi-spherical pin 83a and the second semi-spherical pin 83b of the interlocking member 8 are replaced one solid pin 84, compared to the third embodiment. Therefore the thrust force FS is not generated by the interlocking member 8. The disc thrust force FD1 of the first clutch mechanism CL1 equals $F_{SP}-Fl_{OIL}$ and the disc thrust force FD2 of the second clutch mechanism CL2 equals $Fl_{OIL}-F_{SP}$.

FIG. 19 is an operation chart of the fourth embodiment to attain double engaged conditions when the first transmitting system having the first clutch mechanism CL1, on which only the thrust force of the elastic member 13 acts, is connected before the gear shifting.

FIG. 20 is an operation chart of the fourth embodiment to attain double disconnected conditions.

Figure 21:
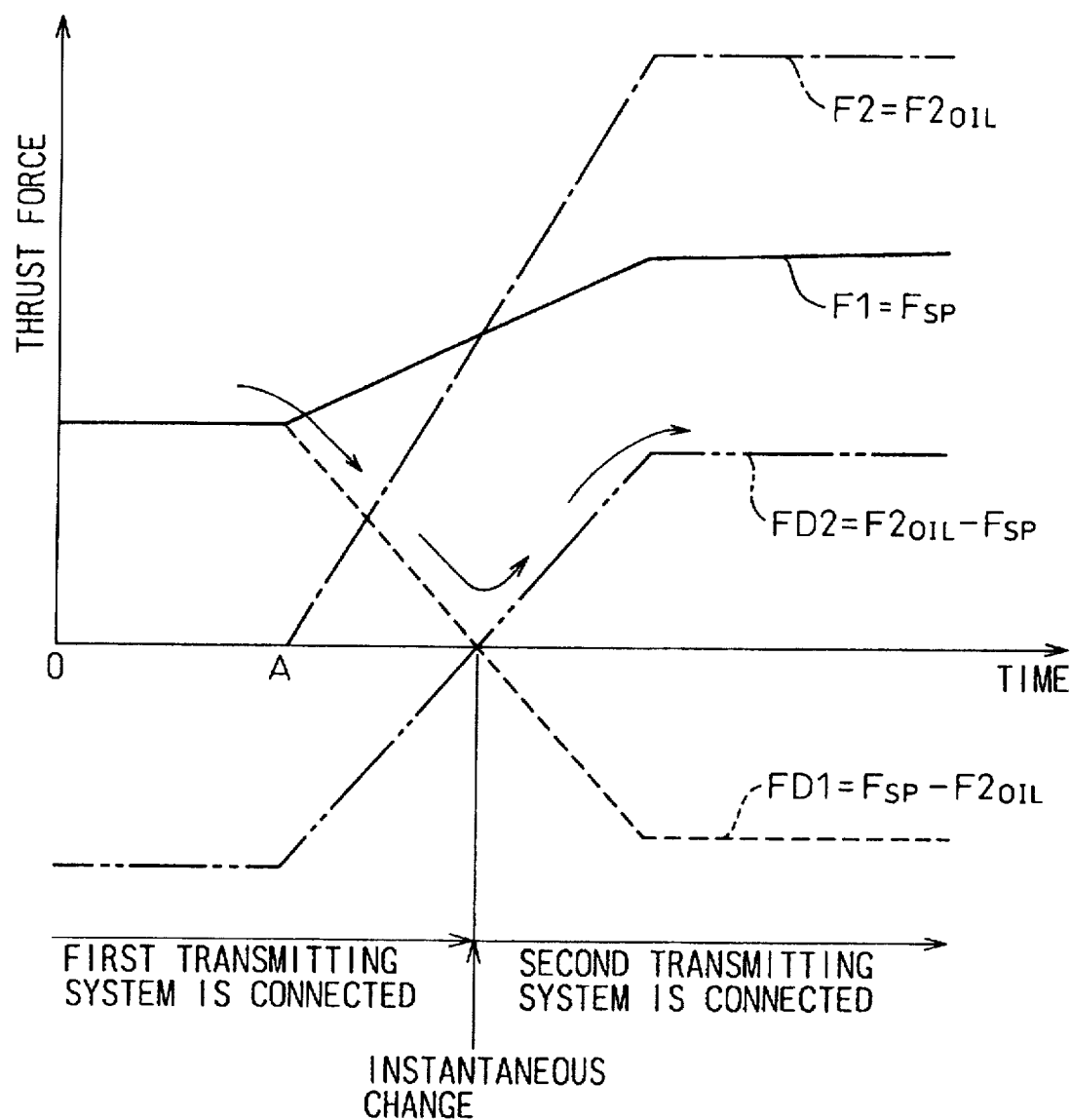
FIG. 21 is a diagram showing a control of changing the thrust forces acting on the pressure plates of the clutch systems of the fourth embodiment in an instantaneous change.

FIG. 21 is an operation chart of the fourth embodiment to attain an instantaneous change.

In each figures, the point "A" is the starting point of applying oil pressure to the second piston 10b of the second clutch mechanism CL2 of the second transmitting system which is connected after the gear shifting. Then, the transmitting system is changed from the first transmitting system to the second transmitting system following the arrow line in each figure.

If the first transmitting system which includes the first clutch mechanism CL1, on which the thrust force of the elastic member 13 acts, is connected after the gear shifting, each operation can be done by following the arrow line in the reverse direction.

In the fourth embodiment, the spring 82, the first semi-spherical pin 83a, the second semi-spherical pin 83b of the interlocking member 8 are replaced one solid pin 84 as described above and, therefore, the construction is simplified compared to the third embodiment. As a result, the device can be made at lower cost.

In the first embodiment through the fourth, the interlocking member 8 is made as a separated body. However, it is also possible to connect one end thereof or form as one unit with the first pressure plate 11a or the second pressure plate 11b.

I claim:

1. A twin-clutch-type transmission comprising:
    a first clutch mechanism including an input member, a first output member, a first pressure plate, and a first thrust means which selectively pushes said first output member to engage said first output member itself to one side of said input member through said first pressure plate;

a second clutch mechanism including an input member, a second output member, a second pressure plate, and a second thrust means which selectively pushes said second output member to engage said second output member to the other side of said input member through said second pressure plate;

a first gear mechanism connected to said first output member of said first clutch mechanism, said first gear mechanism having gear sets for providing a first group of gear ratios;

a second gear mechanism connected to said second output member of said second clutch mechanism, said second gear mechanism having gear sets for providing a second group of gear ratios;

a control means for controlling the thrust forces generated by said thrust means to change one of said two clutch mechanism from an engaged condition to a disengaged condition and to change the other of said two clutch mechanisms from a disengaged condition to an engaged condition; and means for mechanically interlocking said first pressure plate of said first clutch mechanism and said second pressure plate of said second clutch mechanism such that movement of one of said pressure plates is interrelated to movement of the other of said pressure plates during gear changes of said transmission, wherein said means for mechanically interlocking has an elastic element always biasing said first pressure plate and said second pressure plate against each other in a direction of disengaging, even when said first pressure plate is not pushed by said first piston and said second pressure plate is not pushed by said second piston, wherein said control means changes one of said two clutch mechanisms from an engaged condition to a disengaged condition and changes the other of said two clutch mechanisms from a disengaged condition to an engaged condition, under an action of said interlocking means such that said two clutch mechanisms are both disengaged for some period during at least some of said gear changes.

2. A twin-clutch-type transmission according to claim 1, wherein said interlocking member has a definite length in the direction of the thrust force.

3. A twin-clutch-type transmission according to claim 1, wherein said means for mechanically interlocking always has an elastic force basing said first pressure plate and said second pressure plate in a direction of disengaging.

4. A twin-clutch-type transmission according to any one of claim 2 and 3,
    wherein both of said first thrust means and said second thrust means are piston means driven by oil pressure.

5. A twin-clutch-type transmission according to any one of claim 2 and 3,
    wherein one of said first thrust means and said second thrust means is piston means driven by oil pressure, and the other is an elastic member which always gives a thrust force in a direction of engaging.

6. A twin-clutch-type transmission according to claim 4, wherein one of said first thrust means and said second thrust means has an additional elastic member which always gives a thrust force in a direction of engaging.

7. A twin-clutch-type transmission according to claim 1, wherein said interlocking member is composed of a sleeve connected at a center part thereof to the input member, wherein ends of the sleeve are loosely fitted in recesses which are respectively formed in said first and second pressure plates, and wherein said elastic element is accommodated within said sleeve.

8. The transmission of claim 1 wherein said control means changes one of said two clutch mechanisms from an engaged condition to a disengaged condition and changes the other of said two clutch mechanisms from a disengaged condition to an engaged condition such that said two clutch mechanisms are both disengaged for some period during certain of said gear changes which are selected based upon driving conditions.

9. The transmission of claim 1 wherein said control means changes one of said two clutch mechanisms from an engaged condition to a disengaged condition and changes the other of said two clutch mechanisms from a disengaged condition to an engaged condition such that said two clutch mechanisms are both engaged for some period during certain of said gear changes which are selected based upon driving conditions.

10. The transmission of claim 1 wherein said control means changes one of said two clutch mechanisms from an engaged condition to a disengaged condition and simultaneously changes the other of said two clutch mechanisms from a disengaged condition to an engaged condition during certain of said gear changes which are selected based upon driving conditions.

* * * * *